(12) United States Patent
Mountainland et al.

(10) Patent No.: US 11,118,119 B2
(45) Date of Patent: Sep. 14, 2021

(54) UPGRADED EBULLATED BED REACTOR WITH LESS FOULING SEDIMENT

(71) Applicant: HYDROCARBON TECHNOLOGY & INNOVATION, LLC, Lawrenceville, NJ (US)

(72) Inventors: David M. Mountainland, Princeton, NJ (US); Brett M. Silverman, Salt Lake City, UT (US); Michael A. Rueter, Plymouth Meeting, PA (US); Lee Smith, Pleasant Grove, UT (US)

(73) Assignee: HYDROCARBON TECHNOLOGY & INNOVATION, LLC, Lawrenceville, NJ (US)

( * ) Notice: Subject to any disclaimer, the term of this patent is extended or adjusted under 35 U.S.C. 154(b) by 65 days.

(21) Appl. No.: 15/908,111

(22) Filed: Feb. 28, 2018

(65) Prior Publication Data
US 2018/0251690 A1 Sep. 6, 2018

Related U.S. Application Data

(60) Provisional application No. 62/466,011, filed on Mar. 2, 2017.

(51) Int. Cl.
*C10G 47/00* (2006.01)
*C10G 47/02* (2006.01)
(Continued)

(52) U.S. Cl.
CPC ............ *C10G 47/02* (2013.01); *B01J 8/1809* (2013.01); *B01J 8/24* (2013.01); *B01J 27/04* (2013.01);
(Continued)

(58) Field of Classification Search
CPC ........ C10G 47/02; C10G 47/36; C10G 47/30; C10G 75/00; C10G 2300/1044;
(Continued)

(56) References Cited

U.S. PATENT DOCUMENTS

| 2,850,552 | A | 9/1958 | Ogle |
| 3,019,180 | A | 2/1959 | Schreiener et al. |

(Continued)

FOREIGN PATENT DOCUMENTS

| CA | 2004882 | 6/1991 |
| CA | 2088402 | 7/1993 |

(Continued)

OTHER PUBLICATIONS

U.S. Appl. No. 15/615,574, filed Jun. 6, 2017, Mountainland et al.
(Continued)

*Primary Examiner* — Prem C Singh
*Assistant Examiner* — Brandi M Doyle
(74) *Attorney, Agent, or Firm* — Workman Nydegger

(57) ABSTRACT

An ebullated bed hydroprocessing system is upgraded using a dual catalyst system that includes a heterogeneous catalyst and dispersed metal sulfide particles to produce less fouling sediment. The dual catalyst system more effectively converts sediment-forming precursors to produce sediment that is less fouling than sediment produced using only the heterogeneous catalyst and not the dispersed metal sulfide particles. The dual catalyst system provides for a lower rate of equipment fouling for a given sediment production rate and/or concentration. In some cases, sediment production rate and/or concentration can be maintained or increased while equipment fouling is reduced. In some cases, sediment production rate and/or concentration can be increased without increasing equipment fouling.

22 Claims, 10 Drawing Sheets

(51) Int. Cl.

| | | |
|---|---|---|
| *C10G 49/26* | (2006.01) | |
| *C10G 65/00* | (2006.01) | |
| *C10G 75/04* | (2006.01) | |
| *C10G 49/12* | (2006.01) | |
| *B01J 8/18* | (2006.01) | |
| *B01J 8/24* | (2006.01) | |
| *B01J 27/04* | (2006.01) | |
| *B01J 35/00* | (2006.01) | |
| *B01J 35/02* | (2006.01) | |
| *B01J 37/04* | (2006.01) | |
| *B01J 37/08* | (2006.01) | |
| *C10G 47/30* | (2006.01) | |
| *C10G 47/36* | (2006.01) | |
| *C10G 75/00* | (2006.01) | |

(52) U.S. Cl.
CPC ......... *B01J 35/0006* (2013.01); *B01J 35/023* (2013.01); *B01J 37/04* (2013.01); *B01J 37/08* (2013.01); *C10G 47/30* (2013.01); *C10G 47/36* (2013.01); *C10G 49/12* (2013.01); *C10G 49/26* (2013.01); *C10G 65/00* (2013.01); *C10G 75/00* (2013.01); *C10G 75/04* (2013.01); *B01J 2219/00247* (2013.01); *C10G 2300/107* (2013.01); *C10G 2300/1044* (2013.01); *C10G 2300/1077* (2013.01); *C10G 2300/206* (2013.01); *C10G 2300/208* (2013.01); *C10G 2300/301* (2013.01); *C10G 2300/70* (2013.01)

(58) Field of Classification Search
CPC ...... C10G 2300/107; C10G 2300/1077; C10G 2300/208; C10G 2300/70; B01J 8/24; B01J 8/1809; B01J 27/04; B01J 35/0006; B01J 35/023; B01J 37/04; B01J 2219/00247
See application file for complete search history.

(56) References Cited

U.S. PATENT DOCUMENTS

| | | |
|---|---|---|
| 3,161,585 A | 12/1964 | Gleim et al. |
| 3,254,017 A | 5/1966 | Arey, Jr. et al. |
| 3,267,021 A | 8/1966 | Gould |
| 3,297,563 A | 1/1967 | Doumani |
| 3,349,713 A | 10/1967 | Fassbender |
| 3,362,972 A | 1/1968 | Kollar |
| 3,578,690 A | 5/1971 | Becker |
| 3,595,891 A | 7/1971 | Cavitt |
| 3,622,497 A | 11/1971 | Gleim |
| 3,622,498 A | 11/1971 | Stolfa et al. |
| 3,694,351 A | 9/1972 | White |
| 3,694,352 A | 9/1972 | Gleim |
| 3,816,020 A | 6/1974 | Ogles |
| 3,870,623 A | 3/1975 | Johnson et al. |
| 3,892,389 A | 7/1975 | Contastin |
| 3,915,842 A | 10/1975 | Gatsis |
| 3,919,074 A | 11/1975 | Gatsis |
| 3,953,362 A | 4/1976 | Lines et al. |
| 3,983,028 A | 9/1976 | McCollum et al. |
| 3,992,285 A | 11/1976 | Hutchings |
| 4,022,681 A | 5/1977 | Sheng et al. |
| 4,066,530 A | 1/1978 | Aldridge et al. |
| 4,066,561 A | 1/1978 | Nnadi |
| 4,067,798 A | 1/1978 | Hauschildt et al. |
| 4,067,799 A | 1/1978 | Bearden, Jr. et al. |
| 4,068,830 A | 1/1978 | Gray |
| 4,077,867 A | 3/1978 | Aldridge et al. |
| 4,083,803 A | 4/1978 | Oswald et al. |
| 4,125,455 A | 11/1978 | Herbstman |
| 4,134,825 A | 1/1979 | Bearden, Jr. et al. |
| 4,148,750 A | 4/1979 | Pine |
| 4,151,070 A | 4/1979 | Allan et al. |
| 4,169,038 A | 9/1979 | Metrailer et al. |
| 4,178,227 A | 12/1979 | Metrailer et al. |
| 4,181,601 A | 1/1980 | Sze |
| 4,191,636 A | 3/1980 | Ando et al. |
| 4,192,735 A | 3/1980 | Aldridge et al. |
| 4,196,072 A | 4/1980 | Aldridge et al. |
| 4,226,742 A | 10/1980 | Bearden, Jr. et al. |
| 4,252,634 A | 2/1981 | Khulbe et al. |
| 4,285,804 A | 8/1981 | Jacquin et al. |
| 4,298,454 A | 11/1981 | Aldridge et al. |
| 4,305,808 A | 12/1981 | Bowes |
| 4,313,818 A | 2/1982 | Aldridge et al. |
| 4,325,802 A | 4/1982 | Porter et al. |
| 4,338,183 A | 7/1982 | Gatsis |
| 4,352,729 A | 10/1982 | Jacquin et al. |
| 4,370,221 A | 1/1983 | Patmore et al. |
| 4,389,301 A | 6/1983 | Dahlberg et al. |
| 4,411,768 A | 10/1983 | Unger et al. |
| 4,420,008 A | 12/1983 | Shu |
| 4,422,927 A | 12/1983 | Kowalczyk et al. |
| 4,422,960 A | 12/1983 | Shiroto et al. |
| 4,427,532 A | 1/1984 | Varghese |
| 4,430,207 A | 2/1984 | Kukes |
| 4,435,314 A | 3/1984 | van de Leemput et al. |
| 4,452,265 A | 6/1984 | Lonnebring |
| 4,454,023 A | 6/1984 | Lutz |
| 4,455,218 A | 6/1984 | Dymock et al. |
| 4,457,831 A | 7/1984 | Gendler |
| 4,465,630 A | 8/1984 | Akashi et al. |
| 4,467,049 A | 8/1984 | Yoshii et al. |
| 4,485,004 A | 11/1984 | Fisher et al. |
| 4,485,008 A | 11/1984 | Maa et al. |
| 4,508,616 A | 4/1985 | Larrauri et al. |
| 4,513,098 A | 4/1985 | Tsao |
| 4,551,230 A | 11/1985 | Kukes et al. |
| 4,557,823 A | 12/1985 | Kukes et al. |
| 4,557,824 A | 12/1985 | Kukes et al. |
| 4,561,964 A | 12/1985 | Singhal et al. |
| 4,564,441 A | 1/1986 | Kukes et al. |
| 4,567,156 A | 1/1986 | Bearden, Jr. et al. |
| 4,568,657 A | 2/1986 | Sepulveda et al. |
| 4,578,181 A | 3/1986 | Derouane et al. |
| 4,579,646 A | 4/1986 | Grosboll et al. |
| 4,581,344 A | 4/1986 | Ledoux et al. |
| 4,582,432 A | 4/1986 | Mehta |
| 4,585,545 A | 4/1986 | Yancey, Jr. et al. |
| 4,590,172 A | 5/1986 | Isaacs |
| 4,592,827 A | 6/1986 | Galiasso et al. |
| 4,592,830 A | 6/1986 | Howell et al. |
| 4,606,809 A | 8/1986 | Garg |
| 4,608,152 A | 8/1986 | Howell et al. |
| 4,613,427 A | 9/1986 | Sepulveda et al. |
| 4,614,726 A | 9/1986 | Walter |
| 4,626,340 A | 12/1986 | Galiasso et al. |
| 4,633,001 A | 12/1986 | Cells |
| 4,652,311 A | 3/1987 | Gulla et al. |
| 4,652,647 A | 3/1987 | Schlosberg et al. |
| 4,674,885 A | 6/1987 | Erwin et al. |
| 4,676,886 A | 6/1987 | Rahbe et al. |
| 4,678,557 A | 7/1987 | Rodriguez et al. |
| 4,693,991 A | 9/1987 | Bjornson et al. |
| 4,695,369 A | 9/1987 | Garg et al. |
| 4,701,435 A | 10/1987 | Garcia et al. |
| 4,707,245 A | 11/1987 | Baldasarri et al. |
| 4,707,246 A | 11/1987 | Gardner et al. |
| 4,710,486 A | 12/1987 | Lopez et al. |
| 4,713,167 A | 12/1987 | Reno et al. |
| 4,716,142 A | 12/1987 | Laine et al. |
| 4,724,069 A | 2/1988 | Aldag et al. |
| 4,734,186 A | 3/1988 | Parrott et al. |
| 4,740,295 A | 4/1988 | Bearden, Jr. et al. |
| 4,746,419 A | 5/1988 | Peck et al. |
| 4,762,607 A | 8/1988 | Aldridge et al. |
| 4,762,812 A | 8/1988 | Lopez et al. |
| 4,762,814 A | 8/1988 | Parrott et al. |
| 4,764,266 A | 8/1988 | Chen et al. |
| 4,765,882 A | 8/1988 | Aldridge et al. |
| 4,770,764 A | 9/1988 | Ohtake et al. |

(56) References Cited

U.S. PATENT DOCUMENTS

| | | | |
|---|---|---|---|
| 4,772,378 A | 9/1988 | Miyauchi et al. |
| 4,772,387 A | 9/1988 | Simoni |
| 4,802,972 A | 2/1989 | Kukes et al. |
| 4,808,007 A | 2/1989 | King |
| 4,812,228 A | 3/1989 | Angevine et al. |
| 4,824,611 A | 4/1989 | Cells |
| 4,824,821 A | 4/1989 | Lopez et al. |
| 4,834,865 A | 5/1989 | Kukes et al. |
| 4,837,193 A | 6/1989 | Akizuki et al. |
| 4,851,107 A | 7/1989 | Kretschmar et al. |
| 4,851,109 A | 7/1989 | Chen et al. |
| 4,857,496 A | 8/1989 | Lopez et al. |
| 4,859,309 A | 8/1989 | De Vries et al. |
| 4,863,887 A | 9/1989 | Ohtake et al. |
| 4,959,140 A | 9/1990 | Kukes et al. |
| 4,963,247 A | 10/1990 | Belinko et al. |
| 4,970,190 A | 11/1990 | Lopez et al. |
| 4,983,273 A | 1/1991 | Kennedy et al. |
| 4,983,558 A | 1/1991 | Born et al. |
| 5,013,427 A | 5/1991 | Mosby et al. |
| 5,017,535 A | 5/1991 | Schoonhoven et al. |
| 5,017,712 A | 5/1991 | Usui et al. |
| 5,038,392 A | 8/1991 | Morris et al. |
| 5,039,392 A | 8/1991 | Bearden, Jr. et al. |
| 5,055,174 A | 10/1991 | Howell et al. |
| 5,080,777 A | 1/1992 | Aegerter et al. |
| 5,094,991 A | 3/1992 | Lopez et al. |
| 5,108,581 A | 4/1992 | Aldridge et al. |
| 5,114,900 A | 5/1992 | King |
| 5,134,108 A | 7/1992 | Thakur et al. |
| 5,154,818 A | 10/1992 | Harandi et al. |
| 5,162,282 A | 11/1992 | Lopez et al. |
| 5,164,075 A | 11/1992 | Lopez |
| 5,166,118 A | 11/1992 | Kretschmar et al. |
| 5,171,916 A | 12/1992 | Le et al. |
| 5,178,749 A | 1/1993 | Lopez et al. |
| 5,191,131 A | 3/1993 | Takahata et al. |
| 5,254,240 A | 10/1993 | Jacquin et al. |
| 5,281,328 A | 1/1994 | Degnan, Jr. et al. |
| 5,320,500 A | 6/1994 | Cholet |
| 5,332,489 A | 7/1994 | Veluswamy |
| 5,332,709 A | 7/1994 | Nappier et al. |
| 5,358,634 A | 10/1994 | Rankel |
| 5,364,524 A | 11/1994 | Partridge et al. |
| 5,372,705 A | 12/1994 | Bhattacharya et al. |
| 5,374,348 A | 12/1994 | Sears et al. |
| 5,409,595 A | 4/1995 | Harandi et al. |
| 5,435,908 A | 7/1995 | Nelson et al. |
| 5,452,954 A | 9/1995 | Handke et al. |
| 5,460,714 A | 10/1995 | Fixari et al. |
| 5,474,977 A | 12/1995 | Gatsis |
| 5,578,197 A | 11/1996 | Cyr et al. |
| 5,597,236 A | 1/1997 | Fasano |
| 5,622,616 A | 4/1997 | Porter et al. |
| 5,865,537 A | 2/1999 | Streiff et al. |
| 5,866,501 A | 2/1999 | Pradhan et al. |
| 5,868,923 A | 2/1999 | Porter et al. |
| 5,871,638 A | 2/1999 | Pradhan et al. |
| 5,913,324 A | 6/1999 | Signer |
| 5,916,432 A | 6/1999 | McFarlane et al. |
| 5,925,235 A | 7/1999 | Habib |
| 5,932,090 A | 8/1999 | Marchionna et al. |
| 5,935,419 A | 8/1999 | Khan et al. |
| 5,954,945 A | 9/1999 | Cayton et al. |
| 5,962,364 A | 10/1999 | Wilson, Jr. et al. |
| 5,972,202 A | 10/1999 | Benham et al. |
| 6,004,453 A | 12/1999 | Benham et al. |
| 6,059,957 A | 5/2000 | Khan et al. |
| 6,068,758 A | 5/2000 | Strausz |
| 6,086,749 A | 7/2000 | Kramer et al. |
| 6,090,858 A | 7/2000 | El-Sayed |
| 6,093,824 A | 7/2000 | Reichle et al. |
| 6,136,179 A | 10/2000 | Sherwood, Jr. et al. |
| 6,139,723 A | 10/2000 | Pelrine et al. |
| 6,190,542 B1 | 2/2001 | Comolliea et al. |
| 6,214,195 B1 | 4/2001 | Yadav et al. |
| 6,217,746 B1 | 4/2001 | Thakkar et al. |
| 6,239,054 B1 | 5/2001 | Shukis et al. |
| 6,270,654 B1 | 8/2001 | Colyar et al. |
| 6,274,530 B1 | 8/2001 | Cayton et al. |
| 6,277,270 B1 | 8/2001 | Morel et al. |
| 6,309,537 B1 | 10/2001 | Harle et al. |
| 6,342,224 B1 | 1/2002 | Bruck et al. |
| 6,379,532 B1 | 4/2002 | Hoehn et al. |
| 6,454,932 B1 | 9/2002 | Baldassari et al. |
| 6,455,594 B1 | 9/2002 | Tsuji |
| 6,462,095 B1 | 10/2002 | Bonsel et al. |
| 6,550,960 B2 | 4/2003 | Catalfamo et al. |
| 6,596,155 B1 | 7/2003 | Gates et al. |
| 6,660,157 B2 | 12/2003 | Que et al. |
| 6,686,308 B2 | 2/2004 | Mao et al. |
| 6,698,197 B1 | 3/2004 | Peterson |
| 6,698,917 B2 | 3/2004 | Etchells, III et al. |
| 6,712,955 B1 | 3/2004 | Hou et al. |
| 6,783,661 B1 | 8/2004 | Briot et al. |
| 6,797,153 B1 | 9/2004 | Fukuyama et al. |
| 6,884,340 B1 | 4/2005 | Bogdan |
| 6,916,762 B2 | 7/2005 | Shibuya et al. |
| 7,011,807 B2 | 3/2006 | Zhou et al. |
| 7,090,767 B2 | 8/2006 | Kaminsky et al. |
| 7,285,698 B2 | 10/2007 | Liu et al. |
| 7,449,103 B2 | 11/2008 | Lott et al. |
| 7,517,446 B2 | 4/2009 | Lott et al. |
| 7,578,928 B2 | 8/2009 | Lott et al. |
| 7,670,984 B2 | 3/2010 | Wu et al. |
| 7,815,870 B2 | 10/2010 | Lott et al. |
| 7,842,635 B2 | 11/2010 | Zhou et al. |
| 7,951,745 B2 | 5/2011 | Zhou et al. |
| 8,034,232 B2 | 10/2011 | Lott et al. |
| 8,142,645 B2 | 3/2012 | Zhou et al. |
| 8,303,082 B2 | 11/2012 | Lott et al. |
| 8,303,802 B2 | 11/2012 | Lott et al. |
| 8,309,041 B2 | 11/2012 | Lott et al. |
| 8,557,105 B2 | 3/2013 | Lott et al. |
| 8,431,016 B2 | 4/2013 | Lott et al. |
| 8,435,400 B2 | 5/2013 | Kou et al. |
| 8,440,071 B2 | 5/2013 | Lott et al. |
| 8,445,399 B2 | 5/2013 | Wu et al. |
| 8,673,130 B2 | 3/2014 | Lott et al. |
| 9,605,215 B2 | 3/2017 | Lott et al. |
| 9,644,157 B2 | 5/2017 | Harris et al. |
| 2002/0125172 A1 | 9/2002 | Que et al. |
| 2002/0179493 A1 | 12/2002 | Etter |
| 2003/0094400 A1 | 5/2003 | Levy et al. |
| 2003/0171207 A1 | 9/2003 | Shih et al. |
| 2004/0013601 A1 | 1/2004 | Butz et al. |
| 2004/0147618 A1 | 7/2004 | Lee et al. |
| 2005/0109674 A1 | 5/2005 | Klein |
| 2005/0241991 A1* | 11/2005 | Lott ............... B01J 8/226 208/108 |
| 2005/0241992 A1 | 11/2005 | Lott et al. |
| 2005/0241993 A1 | 11/2005 | Lott et al. |
| 2005/0258073 A1 | 11/2005 | Oballa et al. |
| 2005/0279670 A1 | 12/2005 | Long et al. |
| 2006/0060501 A1 | 3/2006 | Gauthier |
| 2006/0079396 A1 | 4/2006 | Saito |
| 2006/0175229 A1 | 8/2006 | Montanari et al. |
| 2006/0201854 A1 | 9/2006 | Lott et al. |
| 2006/0224000 A1 | 10/2006 | Papp et al. |
| 2006/0254956 A1 | 11/2006 | Khan |
| 2006/0289340 A1 | 12/2006 | Brownscombe et al. |
| 2007/0012595 A1 | 1/2007 | Brownscombe et al. |
| 2007/0029228 A1 | 2/2007 | Aoki et al. |
| 2007/0108100 A1 | 5/2007 | Satchell, Jr. |
| 2007/0131587 A1 | 6/2007 | Fukuyama et al. |
| 2007/0138059 A1 | 6/2007 | Farshid et al. |
| 2007/0158236 A1 | 7/2007 | Zhou et al. |
| 2007/0158238 A1 | 7/2007 | Wu et al. |
| 2007/0158239 A1 | 7/2007 | Satchell |
| 2007/0163921 A1 | 7/2007 | Keusenkothen et al. |
| 2007/0175797 A1 | 8/2007 | Iki et al. |
| 2007/0209965 A1 | 9/2007 | Duddy et al. |
| 2008/0107881 A1 | 5/2008 | Nakashiba et al. |
| 2009/0107881 A1 | 4/2009 | Lott et al. |

(56) References Cited

U.S. PATENT DOCUMENTS

| | | |
|---|---|---|
| 2009/0152165 A1 | 6/2009 | Etter |
| 2009/0159505 A1 | 6/2009 | Da Costa et al. |
| 2009/0173666 A1 | 7/2009 | Zhou et al. |
| 2009/0308792 A1 | 12/2009 | Wu et al. |
| 2009/0310435 A1 | 12/2009 | Lott et al. |
| 2010/0065472 A1 | 3/2010 | Chabot |
| 2010/0122931 A1 | 5/2010 | Zimmerman et al. |
| 2010/0294701 A1 | 11/2010 | Lott et al. |
| 2011/0017637 A1 | 1/2011 | Reynolds et al. |
| 2011/0017641 A1 | 1/2011 | Gupta et al. |
| 2012/0152805 A1 | 6/2012 | Chabot |
| 2013/0068658 A1 | 3/2013 | Lott et al. |
| 2013/0068858 A1 | 3/2013 | Nuzzo et al. |
| 2013/0075304 A1 | 3/2013 | Chang et al. |
| 2013/0228494 A1 | 9/2013 | Lott et al. |
| 2013/0233765 A1 | 9/2013 | Lott et al. |
| 2014/0027344 A1 | 1/2014 | Harris |
| 2014/0093433 A1 | 4/2014 | Lott et al. |
| 2014/0291203 A1 | 10/2014 | Molinari et al. |
| 2015/0361360 A1 | 12/2015 | Harris et al. |
| 2017/0066978 A1 | 3/2017 | Lott et al. |
| 2017/0081599 A1 | 3/2017 | Mountainland et al. |
| 2017/0081600 A1 | 3/2017 | Mountainland et al. |

FOREIGN PATENT DOCUMENTS

| | | |
|---|---|---|
| CA | 1295112 | 5/2001 |
| CA | 1966618 | 5/2007 |
| CA | 2579528 | 9/2007 |
| CN | 1219570 | 6/1999 |
| CN | 1295112 A | 5/2001 |
| CN | 1448482 | 10/2003 |
| CN | 2579528 Y | 10/2003 |
| CN | 1950484 | 4/2007 |
| CN | 103228355 A | 7/2013 |
| CN | 108531215 A | 9/2018 |
| DE | 2324441 | 12/1973 |
| DE | 2315114 | 10/1974 |
| DE | 2421934 | 11/1974 |
| EP | 0199399 | 10/1986 |
| EP | 0546686 | 6/1993 |
| EP | 0559399 | 9/1993 |
| EP | 0753846 A1 | 1/1997 |
| EP | 1043069 | 10/2000 |
| EP | 1753846 | 2/2007 |
| EP | 2811006 A1 | 12/2014 |
| EP | 3369801 A1 | 9/2018 |
| GB | 1047698 | 8/1963 |
| JP | 47014205 | 10/1972 |
| JP | 59108091 | 6/1984 |
| JP | 5950276 | 12/1984 |
| JP | 60044587 | 3/1985 |
| JP | 6239634 | 8/1987 |
| JP | 01-165692 A | 6/1989 |
| JP | 2001165692 | 6/1989 |
| JP | 2863858 | 2/1990 |
| JP | 5501829 | 4/1993 |
| JP | 06009966 | 1/1994 |
| JP | 06287574 | 10/1994 |
| JP | 06346064 | 12/1994 |
| JP | 07062355 | 3/1995 |
| JP | 0790282 | 4/1995 |
| JP | 08325580 | 12/1996 |
| JP | 6327596 | 2/1998 |
| JP | 2003193074 | 7/2003 |
| JP | 2007-535604 A | 12/2007 |
| JP | 2011502204 | 1/2011 |
| JP | 2015-527452 A | 9/2015 |
| RU | 2181751 C2 | 4/2002 |
| WO | 199723582 | 12/1996 |
| WO | 199734967 | 3/1997 |
| WO | 1997029841 | 8/1997 |
| WO | 00/01408 A2 | 1/2000 |
| WO | 2000502146 | 2/2000 |
| WO | 200075336 | 12/2000 |
| WO | 200101408 | 1/2001 |
| WO | 200141799 | 6/2001 |
| WO | 2005104749 | 11/2005 |
| WO | 2005104752 | 11/2005 |
| WO | 2006116913 | 11/2006 |
| WO | 2007078622 | 7/2007 |
| WO | 2007106783 | 9/2007 |
| WO | 2008/151972 A2 | 12/2008 |
| WO | 2009058785 | 5/2009 |
| WO | 2010033487 | 3/2010 |
| WO | 2017053117 | 3/2017 |

OTHER PUBLICATIONS

Aspen Hydrocracker™: A simulation system for monitoring, planning and optimizing hydrocracking and hydrotreating units, www.aspentec.com/brochures/hydrocracker.pdf (2001).

Criterion: Hydrocracking Process Description and Criterion/Zeolyst Hydrocracking Catalyst Applications, www.criterioncatalysts.com (2001).

Database CA [online] Chemical Abstracts Service retrieved from STN Database accession No. 1991:42412.

Del Bianco et al. "Upgrading Heavy Oil Using Slurry Processes" Chemtech, Nov. 30, 1995 (Nov. 30, 1995), pp. 35-43.

Hawley's Condensed Chemical Dictionary, Richard J. Lewis, Sr. 15 Edition, 2007, p. 321.

"HYVAHL, Significantly Improved RFCC Performance or Low Sulfur Fuel Oils Via Residue Hydrotreatment", Axens IPF Group Technologies, pp. 1,2 (Jan. 2003).

Lott et al.: "(HC)3 Process—A Slurry Hydrocracking Technology Designed to Convert Bottoms of Heavy Oils" 7th UNITAR International Conference of Heavy Crude and Tar Sands, Beijing, Oct. 27, 1998 (Oct. 27, 1998) pp. 1-8.

McFarlane et al. "Dispersion and Activity of Inorganic Catalyst Precursor in Heavy Oil" Boston Congress ACS Energy and Fuel Diversification, p. 496, Aug. 31, 1998.

Molecular Profile Report, Cobalt Benzoate, http://chemfinder.cambridgesoft.com/chembiofinder/forms/search/contentarea/chembiovizsearch.aspx?formgroupid=8&appname=chembiofinder&allowfullsearch=true&keeprecordcountsynchronized-flase&searchcriteraid=47searchcriteravalue=932-69-4&currentindex=0.

"OCR Moving Bed Technology for the future", pp. 1-2 (at least as early as 2004).

Panariti et al.: "Petroleum Residue Upgrading with Dispered Catalysts Part 1. Catalysts Activity and Selctivity" Applied Catalysts A: General, vol. 204, Mar. 31, 2000 (Mar. 1, 2000) pp. 203-213.

Panariti et al.: "Petroleum Residue Upgrading with Dispersed Catalysts Part 2. Effect of Operating Conditions" Applied Catalysts A: General, vol. 204, Mar. 31, 2000 (Mar. 1, 2000) pp. 215-222.

Papaioannou et al., "Alkali-Metal- and Alkaline-Earth-Promoted Catalysts for Coal Liquefaction Applications", Energy & Fuels, vol. 4, No. 1, pp. 38-42 (1990).

Plain et al., "Options for Resid Conversion", Axens IFP Group Technologies, pp. 1-10 (at least as early as 2004).

Santori et al. "Eni Slurry Technology:, A Technology to Convert the Bottom of the Barrel to Transportation Fuels", 3rd Bottom of the Barrell Technology Conference & Exhibition (Oct. 2004).

Seader et al, "Perry's Chemical Engineers' Handbook", 7th Edition, Section 13—Distillation, 1997, 13-25.

Shen et al., Hydrocracking of Liaohe Vacuum Residue With Bimeta:, Preprints of Symposia—American Chemical society, Division of Fuel Chemistry (1998), 43(3), 481-485, OCDEN: Psadfz, 1998, XP009117504.

Rana et al., A Review of recent advances on process technologies for upgrading of heavy oils and residua, Sep. 7, 2016, full text, retrieved from http://www.sciencedirect.com/science/article/pii/S001623610600295X on Aug. 8, 2017.

U.S. Appl. No. 11/117,262, Feb. 4, 2008, Office Action.
U.S. Appl. No. 11/117,202, Apr. 29, 2008, Office Action.
U.S. Appl. No. 11/117,203, Jul. 10, 2008, Office Action.
U.S. Appl. No. 11/117,262, Jul. 17, 2008, Office Action.
U.S. Appl. No. 11/117,202, Aug. 18, 2008, Notice of Allowance.
U.S. Appl. No. 11/117,262, Dec. 5, 2008, Office Action.

(56) References Cited

OTHER PUBLICATIONS

U.S. Appl. No. 11/117,203, Dec. 10, 2008, Notice of Allowance.
U.S. Appl. No. 11/117,262, Apr. 30, 2009, Notice of Allowance.
U.S. Appl. No. 11/374,369, May 28, 2009, Office Action.
U.S. Appl. No. 11/117,262, Jun. 26, 2009, Notice of Allowance.
U.S. Appl. No. 11/932,201, Nov. 23, 2009, Office Action.
U.S. Appl. No. 12/106,112, Jan. 26, 2010, Office Action.
U.S. Appl. No. 11/374,369, Mar. 18, 2010, Office Action.
U.S. Appl. No. 11/932,201, May 13, 2010, Office Action.
U.S. Appl. No. 12/106,112, Jun. 22, 2010, Notice of Allowance.
U.S. Appl. No. 11/968,934, Sep. 20, 2010, Office Action.
U.S. Appl. No. 12/838,761, Nov. 26, 2010, Office Action.
U.S. Appl. No. 11/968,934, Jan. 25, 2011, Office Action.
U.S. Appl. No. 11/932,201, Apr. 21, 2011, Notice of Allowance.
U.S. Appl. No. 12/838,761, May 18, 2011, Office Action.
U.S. Appl. No. 11/932,201, Jun. 8, 2011, Supp Notice of Allowance.
U.S. Appl. No. 11/968,934, Jul. 13, 2011, Final Office Action.
U.S. Appl. No. 12/547,278, Dec. 29, 2011, Office Action.
U.S. Appl. No. 11/968,934, Jan. 6, 2012, Notice of Allowance.
U.S. Appl. No. 13/116,195, Jan. 12, 2012, Office Action.
U.S. Appl. No. 13/116,195, Jul. 11, 2012, Notice of Allowance.
U.S. Appl. No. 13/236,209, Jul. 11, 2012, Notice of Allowance.
U.S. Appl. No. 12/838,761, Jul. 20, 2012, Office Action.
U.S. Appl. No. 13/113,722, Aug. 8, 2012, Office Action.
U.S. Appl. No. 12/547,278, Sep. 7, 2012, Office Action.
U.S. Appl. No. 12/838,761, Jan. 10, 2013, Notice of Allowance.
U.S. Appl. No. 13/113,722, Jan. 22, 2013, Notice of Allowance.
U.S. Appl. No. 13/675,629, Feb. 7, 2013, Office Action.
U.S. Appl. No. 13/675,629, Jun. 14, 2013, Notice of Allowance.
U.S. Appl. No. 13/866,220, Jun. 28, 2013, Office Action.
U.S. Appl. No. 13/866,220, Nov. 6, 2013, Notice of Allowance.
U.S. Appl. No. 11/374,369, Mar. 12, 2014, Office Action.
U.S. Appl. No. 12/547,278, Apr. 22, 2014, Office Action.
U.S. Appl. No. 13/242,979, Aug. 21, 2014, Office Action.
U.S. Appl. No. 11/374,369, Aug. 28, 2014, Office Action.
U.S. Appl. No. 12/547,278, Nov. 24, 2014, Final Office Action.
U.S. Appl. No. 13/242,979, Mar. 12, 2015, Final Office Action.
U.S. Appl. No. 13/865,726, May 12, 2015, Office Action.
U.S. Appl. No. 13/561,479, Aug. 11, 2015, Office Action.
U.S. Appl. No. 13/561,479, Nov. 4, 2015, Final Office Action.
U.S. Appl. No. 13/865,726, Jan. 11, 2016, Final Office Action.
U.S. Appl. No. 13/561,479, Apr. 27 2016, Office Action.
U.S. Appl. No. 11/374,369, May 18, 2016, Office Action.
U.S. Appl. No. 14/095,698, Jul. 8, 2016, Office Action.
U.S. Appl. No. 13/865,726, Aug. 30, 2016, Office Action.
U.S. Appl. No. 13/561,479, Oct. 21, 2016, Final Office Action.
U.S. Appl. No. 12/547,278, Oct. 28, 2016, Office Action.
U.S. Appl. No. 11/374,369, Nov. 9, 2016, Final Office Action.
U.S. Appl. No. 13/865,726, Jan. 13, 2017, Final Office Action.
U.S. Appl. No. 14/836,792, Apr. 11, 2017, Office Action.
U.S. Appl. No. 12/547,278, Apr. 14, 2017, Final Office Action.
U.S. Appl. No. 13/865,726, Apr. 26, 2017, Office Action.
U.S. Appl. No. 13/865,726, Aug. 14, 2017, Final Office Action.
U.S. Appl. No. 11/374,369, Sep. 1, 2017, Office Action.
U.S. Appl. No. 14/836,792, Sep. 25, 2017, Final Office Action.
U.S. Appl. No. 12/547,278, Nov. 29, 2017, Office Action.
U.S. Appl. No. 15/258,653, Apr. 2, 2018, Office Action.
U.S. Appl. No. 15/258,706, Apr. 2, 2018, Office Action.
U.S. Appl. No. 15/615,574, Apr. 2, 2018, Office Action.
U.S. Appl. No. 11/374,369, Apr. 24, 2018, final Office Action.
U.S. Appl. No. 15/354,230, Jun. 12, 2018, Office Action.
Course: Chemical Technology (Organic) Module VI, Lecture 5 Catalytic Cracking: Fluid Catalytic Cracking and Hydrocracking downloaded Jun. 2019.
U.S. Appl. No. 15/258,653, Sep. 21, 2018, Final Office Action.
U.S. Appl. No. 15/258,653, Mar. 8, 2019, Office Action.
U.S. Appl. No. 15/258,653, Jul. 18, 2019, Final Office Action.
U.S. Appl. No. 15/258,706, Sep. 21, 2018, Final Office Action.
U.S. Appl. No. 15/258,706, Mar. 8, 2019, Office Action.
U.S. Appl. No. 15/258,706, Jul. 23, 2019, Final Office Action.
U.S. Appl. No. 15/615,574, Sep. 21, 2018, Final Office Action.
U.S. Appl. No. 15/615,574, Mar. 21, 2019, Office Action.
U.S. Appl. No. 15/615,574, Jul. 25, 2019, Final.
Non-Final Office Action received for U.S. Appl. No. 16/594,847, dated Nov. 13, 2020, 8 pages.
Hydrocracking of Liaohe Vacuum Residue With Bimeta:, Shen et al., Preprints of Symposia—American Chemical society, Division of Fuel Chemistry (1998), 43(3), 481-485, OCDEN: Psadfz, 1998,XP009117504.
Lee, Sunggyu et al, Handook of Alternative Fuel Technologies, 2007, pp. 187-188.
Lewis, Richard J., Hawley's Condensed Chemical Dictionary, 15 Edition, 2007, p. 321.
N. Panariti et al.: "petroleum Residue Upgrading with Dispered Catalysts Part 1. Catalysts Activity and Selctivity" Applied Catalysts A: General, vol. 204, Mar. 31, 2000 (Mar. 1, 2000) pp. 203-213.
Notice of Allowance dated Aug. 5, 2010 cited in U.S. Appl. No. 11/461,652.
Notice of Allowance dated Oct. 27, 2009 cited in U.S. Appl. No. 11/327,085.
Office Action dated Apr. 2, 2009 cited in U.S. Appl. No. 11/327,085.
Office Action dated Mar. 8, 2010 cited in U.S. Appl. No. 11/461,652.
Office Action dated Sep. 16, 2010 cited in U.S. Appl. No. 11/968,861.
Office Action received for EA Patent Application No. 201892721, dated Jul. 8, 2020, 8 pages ( 4 pages of English Translation and 4 pages of Original Document).
Office Action received for U.S. Appl. No. 13/236,209 dated Feb. 21, 2012.
U.S. Appl. filed Apr. 18, 2013, Lott et al., U.S. Appl. No. 13/856,726.
U.S. Appl. filed Dec. 3, 2013, Lott et al., U.S. Appl. No. 14/095,698.
U.S. Appl. No. 11/327,249, filed Jan. 6, 2006, Zhou et al.
U.S. Appl. No. 11/968,861, filed Feb. 2, 2011, Notice of Allowance.
U.S. Application Filed on Apr. 19, 2013, by Lott et al., U.S. Appl. No. 13/866,220.
U.S. Application Filed on Nov. 17, 2015, by Lott et al., U.S. Appl. No. 15/354,230.
U.S. Patent Application filed on May 23, 2011, by Lott et al., U.S. Appl. No. 13/113,722.
US. Appl. filed May 26, 2011, Lott et al., U.S. Appl. No. 13/116,195.

* cited by examiner

UPGRADED EBULLATED BED REACTOR WITH LESS FOULING SEDIMENT

CROSS REFERENCE TO RELATED APPLICATION

This application claims the benefit of U.S. Provisional Patent Application No. 62/466,011, filed Mar. 2, 2017, the disclosure of which is incorporated herein by reference in its entirety.

BACKGROUND OF THE INVENTION

1. The Field of the Invention

The invention relates to heavy oil hydroprocessing methods and systems, such as ebullated bed hydroprocessing methods and systems, which utilize a dual catalyst system and operate to produce less fouling sediment.

2. The Relevant Technology

There is an ever-increasing demand to more efficiently utilize low quality heavy oil feedstocks and extract fuel values therefrom. Low quality feedstocks are characterized as including relatively high quantities of hydrocarbons that nominally boil at or above 524° C. (975° F.). They also contain relatively high concentrations of sulfur, nitrogen and/or metals. High boiling fractions derived from these low quality feedstocks typically have a high molecular weight (often indicated by higher density and viscosity) and/or low hydrogen/carbon ratio, which is related to the presence of high concentrations of undesirable components, including asphaltenes and carbon residue. Asphaltenes and carbon residue are difficult to process and commonly cause fouling of conventional catalysts and hydroprocessing equipment because they contribute to the formation of coke and sediment.

In a given ebullated bed system, the rate of production of converted products is often limited by fouling. When attempts are made to raise the rate of production beyond a certain practical limit, the rate of fouling of certain heat exchangers or other process equipment becomes too rapid, requiring more frequent shutdowns for maintenance and cleaning. Typically, a refinery relates the observed rate of equipment fouling to measurements of sediment production and arrives at an operating sediment limit, above which the refinery will avoid operating the ebullated bed hydrocracker. Furthermore, sediment production and equipment fouling place limitations on downstream processing of high boiling fractions.

Lower quality heavy oil feedstocks which contain higher concentrations of asphaltenes, carbon residue, sulfur, nitrogen, and metals include heavy crude, oil sands bitumen, and residuum left over from conventional refinery process. Residuum (or "resid") can refer to atmospheric tower bottoms and vacuum tower bottoms. Atmospheric tower bottoms can have a boiling point of at least 343° C. (650° F.) although it is understood that the cut point can vary among refineries and be as high as 380° C. (716° F.). Vacuum tower bottoms (also known as "resid pitch" or "vacuum residue") can have a boiling point of at least 524° C. (975° F.), although it is understood that the cut point can vary among refineries and be as high as 538° C. (1000° F.) or even 565° C. (1050° F.).

By way of comparison, Alberta light crude contains about 9% by volume vacuum residue, while Lloydminster heavy oil contains about 41% by volume vacuum residue, Cold Lake bitumen contains about 50% by volume vacuum residue, and Athabasca bitumen contains about 51% by volume vacuum residue. As a further comparison, a relatively light oil such as Dansk Blend from the North Sea region only contains about 15% vacuum residue, while a lower-quality European oil such as Ural contains more than 30% vacuum residue, and an oil such as Arab Medium is even higher, with about 40% vacuum residue. These examples highlight the importance of being able to convert vacuum residues when lower-quality crude oils are used.

Converting heavy oil into useful end products involves extensive processing, such as reducing the boiling point of the heavy oil, increasing the hydrogen-to-carbon ratio, and removing impurities such as metals, sulfur, nitrogen and coke precursors. Examples of hydrocracking processes using conventional heterogeneous catalysts to upgrade atmospheric tower bottoms include fixed-bed hydroprocessing, ebullated-bed hydroprocessing, and moving-bed hydroprocessing. Noncatalytic upgrading processes for upgrading vacuum tower bottoms include thermal cracking, such as delayed coking, flexicoking, visbreaking, and solvent extraction.

SUMMARY OF THE INVENTION

Disclosed herein are methods for upgrading an ebullated bed hydroprocessing system to produce less fouling sediment. Also disclosed are upgraded ebullated bed hydroprocessing systems to produce less fouling sediment. The disclosed methods and systems involve the use of a dual catalyst system comprised of a solid supported catalyst and well-dispersed (e.g., homogeneous) catalyst particles. The dual catalyst system permits an ebullated bed reactor to operate at the same or higher severity for heavy oil of a given quality because the sediment that is produced causes less equipment fouling compared to sediment produced by the same reactor using only the solid supported catalyst.

In some embodiments, a method of upgrading an ebullated bed hydroprocessing system to produce less fouling sediment comprises: (1) operating an ebullated bed reactor using a heterogeneous catalyst to hydroprocess heavy oil at initial conditions, including an initial production rate of converted products, an initial sediment production rate and/or concentration in a process stream, and an initial rate of equipment fouling; (2) thereafter upgrading the ebullated bed reactor to operate using a dual catalyst system comprised of dispersed metal sulfide catalyst particles and heterogeneous catalyst; and (3) operating the upgraded ebullated bed reactor using the dual catalyst system to produce less fouling sediment, resulting in less equipment fouling at a given sediment production rate and/or concentration compared to when operating the ebullated bed reactor at the initial conditions.

In some embodiments, operating the upgraded ebullated bed reactor using the dual catalyst system to produce less fouling sediment includes at least one of: (i) reducing the sediment production rate and/or concentration in a process stream and reducing the rate of equipment fouling by a greater amount than the reduction in sediment production rate and/or concentration; (ii) maintaining a similar sediment production rate and/or concentration while reducing the rate of equipment fouling; or (iii) increasing the sediment production rate and/or concentration without increasing the rate of equipment fouling.

In some embodiments, operating the upgraded ebullated bed reactor using the dual catalyst system to produce less fouling sediment comprises: (i) producing converted products at a same or similar rate as the initial production rate of converted products when operating at the initial conditions; (ii) producing sediment at a reduced rate and/or concentration in a process stream compared to the initial sediment production rate and/or concentration when operating at the initial conditions; and (iii) equipment fouling occurring at a reduced rate compared to the initial rate of equipment fouling when operating at the initial conditions, and wherein the equipment fouling rate is reduced to a greater degree than the reduction in sediment production rate and/or concentration.

In some embodiments, operating the upgraded ebullated bed reactor using the dual catalyst system to produce less fouling sediment comprises: (i) producing converted products at a higher rate than the initial production rate of converted products when operating at the initial conditions; (ii) producing sediment at a rate and/or concentration in a process stream that is no higher than the initial sediment production rate and/or concentration when operating at the initial conditions; and (iii) equipment fouling occurring at a reduced rate compared to the initial rate of equipment fouling when operating at the initial conditions.

In some embodiments, operating the upgraded ebullated bed reactor using the dual catalyst system to produce less fouling sediment comprises: (i) producing converted products at a higher rate than the initial production rate of converted products when operating at the initial conditions; (ii) producing sediment at a higher rate and/or concentration in a process stream than when operating at the initial conditions; and (iii) equipment fouling occurring at a rate that is no higher than the initial rate of equipment fouling when operating at the initial conditions.

In some embodiments, the production rate of converted products can be increased, when operating the upgraded ebullated bed reactor using the dual catalyst system, by at least one of: (i) higher temperature and higher conversion at same or similar throughput as when operating at the initial conditions; (ii) higher temperature and higher throughput at same or similar conversion as when operating at the initial conditions; or (iii) higher temperature, higher throughput, and higher conversion than when operating at the initial conditions. In some embodiments, increasing the production rate of converted products can include increasing throughput by at least 2.5%, at least 5%, at least 10%, or at least 20% when operating the upgraded ebullated bed reactor than when operating at the initial conditions. In some embodiments, increasing the production rate of converted products can include increasing conversion by at least 2.5%, at least 5%, at least 7.5%, at least 10%, or at least 15% when operating the upgraded ebullated bed reactor than when operating at the initial conditions. In some embodiments, increasing the production rate of converted products can include increasing temperature by at least 2.5° C., at least 5° C., at least 7.5° C., or at least 10° C. when operating the upgraded ebullated bed reactor than when operating at the initial conditions.

In some embodiments, the rate of equipment fouling can be determined, when operating at the initial conditions and when operating the upgraded ebullated bed reactor using the dual catalyst system, by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers; (ix) frequency of cleaning atmospheric and/or vacuum distillation towers; or (x) frequency of maintenance turnarounds.

In some embodiments, sediment production can be determined, when operating at the initial conditions and when operating the upgraded ebullated bed reactor using the dual catalyst system, by at least one of: (i) absolute rate of sediment production (e.g., quantity per unit time); or (ii) sediment concentration in at least one process stream. In some embodiments, the sediment concentration can be measured in at least one process stream selected from atmospheric residue, atmospheric distillation tower bottoms, vacuum residue, vacuum distillation tower bottoms, atmospheric tower feed, hot low pressure separator product, fuel oil product, or vacuum tower bottoms after addition of cutter stocks.

In some embodiments, after upgrading the ebullated bed reactor to use the dual catalyst system the sediment production rate and/or concentration in a process stream is maintained or increased compared to the initial sediment production rate and/or concentration, and the rate of equipment fouling is decreased by at least 5%, 25%, 50%, or 75% compared to the initial rate of equipment fouling.

In some embodiments, after upgrading to use the dual catalyst system the sediment production rate is increased by at least 2%, 10%, 20%, or 33% compared to the initial sediment production rate and the rate of equipment fouling is maintained or decreased compared to the initial rate of equipment fouling.

In some embodiments, after upgrading to use the dual catalyst system the sediment concentration in a process stream is increased by at least 2%, 10%, 20%, or 33% compared to the initial sediment concentration and the rate of equipment fouling is maintained or decreased compared to the initial rate of equipment fouling.

In some embodiments, after upgrading to use the dual catalyst system the sediment production rate is reduced by at least 2%, 10%, 30%, or 50% compared to the initial sediment production rate and the rate of equipment fouling is reduced by an even greater percentage than the percent reduction in sediment production rate compared to the initial rate of equipment fouling.

In some embodiments, after upgrading to use the dual catalyst system the sediment concentration in a process stream is reduced by at least 2%, 10%, 30%, or 50% compared to the initial sediment concentration and the rate of equipment fouling is reduced by an even greater percentage than the percent reduction in sediment concentration compared to the initial rate of equipment fouling.

In some embodiments, the dispersed metal sulfide catalyst particles are less than 1 µm in size, or less than about 500 nm in size, or less than about 250 nm in size, or less than about 100 nm in size, or less than about 50 nm in size, or less than about 25 nm in size, or less than about 10 nm in size, or less than about 5 nm in size.

In some embodiments, the dispersed metal sulfide catalyst particles are formed in situ within the heavy oil from a catalyst precursor. By way of example and not limitation, the dispersed metal sulfide catalyst particles can be formed by blending a catalyst precursor into an entirety of the heavy oil prior to thermal decomposition of the catalyst precursor and formation of active metal sulfide catalyst particles. By way of further example, methods may include mixing a catalyst precursor with a diluent hydrocarbon to form a diluted precursor mixture, blending the diluted precursor mixture with the heavy oil to form conditioned heavy oil, and heating the conditioned heavy oil to decompose the catalyst precursor and form the dispersed metal sulfide catalyst particles in situ within the heavy oil.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Introduction and Definitions

Figure 1:
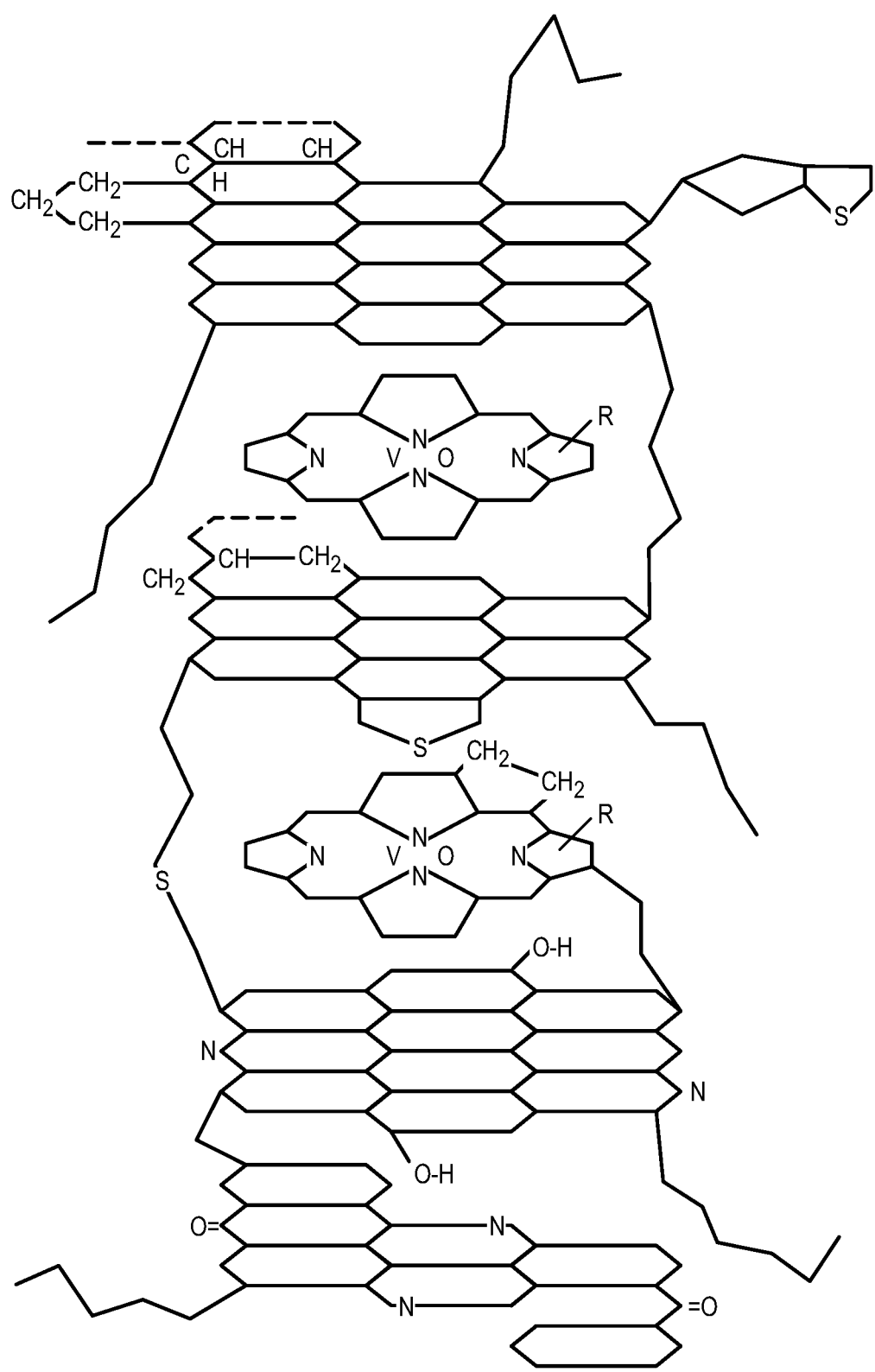
FIG. 1 depicts a hypothetical molecular structure of asphaltene.

The present invention relates to methods for upgrading an ebullated bed hydroprocessing system to produce less fouling sediment. An upgraded ebullated bed system is created by carrying out the disclosed method.

The term "sediment" refers to solids formed in a liquid stream that can settle out. Sediments can include inorganics, coke, or insoluble asphaltenes that precipitate after conversion. Sediment in petroleum products is commonly measured using the IP-375 hot filtration test procedure for total sediment in residual fuel oils published as part of ISO 10307 and ASTM D4870. Other tests include the IP-390 sediment test and the Shell hot filtration test. Sediment is related to components of the oil that have a propensity for forming solids during processing and handling. These solid-forming components have multiple undesirable effects in a hydroconversion process, including degradation of product quality and operability problems related to equipment fouling. It should be noted that although the strict definition of sediment is based on the measurement of solids in a sediment test, it is common for the term to be used more loosely to refer to the solids-forming components of the oil itself, which may not be present in the oil as actual solids, but which contribute to solids formation under certain conditions.

"Sediment production" may be expressed as the absolute production rate (e.g., lb/hr or kg/hr) or as the concentration (e.g., wt %) within a process stream. Therefore, the sediment production may be determined, when operating at the initial conditions and when operating the upgraded ebullated bed reactor using the dual catalyst system, by at least one of (i) absolute sediment production rate or (ii) sediment concentration in at least one process stream. For example, sediment concentration can be measured in at least one process stream selected from atmospheric residue, atmospheric distillation tower bottoms, vacuum residue, vacuum distillation tower bottoms, atmospheric tower feed, hot low pressure separator product, fuel oil product, vacuum tower bottoms after addition of cutter stocks.

It should be noted that either sediment production rate or concentration can be changed through the use of the dual catalyst system, but not necessarily both simultaneously, depending on the details of the unit operation. For example, when a unit is operated a significantly higher total rate of production of converted products, the total amount of bottoms product after separation (e.g., by hot separation, atmospheric distillation and/or vacuum distillation) may be reduced, particularly in cases where higher production is achieved through the use of higher temperature and conversion at equal throughput. In such case, the measured sediment concentration in the liquid product or other process stream may be equal to or higher than when operating at initial conditions, even when the absolute sediment production rate is lower.

The term "fouling" refers to the formation of an undesirable phase (foulant) that interferes with processing. The foulant is normally a carbonaceous material or solid that deposits and collects within the processing equipment. Equipment fouling can result in loss of production due to equipment shutdown, decreased performance of equipment, increased energy consumption due to the insulating effect of foulant deposits in heat exchangers or heaters, increased maintenance costs for equipment cleaning, reduced efficiency of fractionators, and reduced reactivity of heterogeneous catalyst.

The "rate of equipment fouling" before and after upgrading a hydrocracking reactor to use the dual catalyst system can be determined by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers;

(ix) frequency of cleaning atmospheric and/or vacuum distillation towers; or (x) frequency of maintenance turnarounds.

The term "heavy oil feedstock" shall refer to heavy crude, oil sands bitumen, bottom of the barrel and residuum left over from refinery processes (e.g., visbreaker bottoms), and any other lower quality materials that contain a substantial quantity of high boiling hydrocarbon fractions and/or that include a significant quantity of asphaltenes that can deactivate a heterogeneous catalyst and/or cause or result in the formation of coke precursors and sediment. Examples of heavy oil feedstocks include, but are not limited to, Lloydminster heavy oil, Cold Lake bitumen, Athabasca bitumen, atmospheric tower bottoms, vacuum tower bottoms, residuum (or "resid"), resid pitch, vacuum residue (e.g., Ural VR, Arab Medium VR, Athabasca VR, Cold Lake VR, Maya VR, and Chichimene VR), deasphalted liquids obtained by solvent deasphalting, asphaltene liquids obtained as a byproduct of deasphalting, and nonvolatile liquid fractions that remain after subjecting crude oil, bitumen from tar sands, liquefied coal, oil shale, or coal tar feedstocks to distillation, hot separation, solvent extraction, and the like. By way of further example, atmospheric tower bottoms (ATB) can have a nominal boiling point of at least 343° C. (650° F.) although it is understood that the cut point can vary among refineries and be as high as 380° C. (716° F.). Vacuum tower bottoms can have a nominal boiling point of at least 524° C. (975° F.), although it is understood that the cut point can vary among refineries and be as high as 538° C. (1000° F.) or even 565° C. (1050° F.).

The terms "asphaltene" and "asphaltenes" shall refer to materials in a heavy oil feedstock that are typically insoluble in paraffinic solvents such as propane, butane, pentane, hexane, and heptane. Asphaltenes can include sheets of condensed ring compounds held together by heteroatoms such as sulfur, nitrogen, oxygen and metals. Asphaltenes broadly include a wide range of complex compounds having anywhere from 80 to 1200 carbon atoms, with predominating molecular weights, as determined by solution techniques, in the 1200 to 16,900 range. About 80-90% of the metals in the crude oil are contained in the asphaltene fraction which, together with a higher concentration of non-metallic heteroatoms, renders the asphaltene molecules more hydrophilic and less hydrophobic than other hydrocarbons in crude. A hypothetical asphaltene molecule structure developed by A.G. Bridge and co-workers at Chevron is depicted in FIG. 1. Generally, asphaltenes are typically defined based on the results of insolubles methods, and more than one definition of asphaltenes may be used. Specifically, a commonly used definition of asphaltenes is heptane insolubles minus toluene insolubles (i.e., asphaltenes are soluble in toluene; sediments and residues insoluble in toluene are not counted as asphaltenes). Asphaltenes defined in this fashion may be referred to as "$C_7$ asphaltenes". However, an alternate definition may also be used with equal validity, measured as pentane insolubles minus toluene insolubles, and commonly referred to as "$C_5$ asphaltenes". In the examples of the present invention, the $C_7$ asphaltene definition is used, but the $C_5$ asphaltene definition can be readily substituted.

The "quality" of heavy oil can be measured by at least one characteristic selected from, but not limited to: (i) boiling point; (ii) concentration of sulfur; (iii) concentration of nitrogen; (iv) concentration of metals; (v) molecular weight; (vi) hydrogen to carbon ratio; (vii) asphaltene content; and (viii) sediment forming tendency.

A "lower quality heavy oil" and/or "lower quality feedstock blend" can have at least one lower quality characteristic compared to an initial heavy oil feedstock selected from, but not limited to: (i) higher boiling point; (ii) higher concentration of sulfur; (iii) higher concentration of nitrogen; (iv) higher concentration of metals; (v) higher molecular weight (often indicated by higher density and viscosity); (vi) lower hydrogen to carbon ratio; (vii) higher asphaltene content; and (viii) greater sediment forming tendency.

The term "opportunity feedstock" refers to lower quality heavy oils and lower quality heavy oil feedstock blends having at least one lower quality characteristic compared to an initial heavy oil feedstock. An opportunity feedstock also typically has a lower market value (or price) compared to an initial feedstock.

The terms "hydrocracking" and "hydroconversion" shall refer to a process whose primary purpose is to reduce the boiling range of a heavy oil feedstock and in which a substantial portion of the feedstock is converted into products with boiling ranges lower than that of the original feedstock. Hydrocracking or hydroconversion generally involves fragmentation of larger hydrocarbon molecules into smaller molecular fragments having a fewer number of carbon atoms and a higher hydrogen-to-carbon ratio. The mechanism by which hydrocracking occurs typically involves the formation of hydrocarbon free radicals during thermal fragmentation, followed by capping of the free radical ends or moieties with hydrogen. The hydrogen atoms or radicals that react with hydrocarbon free radicals during hydrocracking can be generated at or by active catalyst sites.

The term "hydrotreating" shall refer to operations whose primary purpose is to remove impurities such as sulfur, nitrogen, oxygen, halides, and trace metals from the feedstock and saturate olefins and/or stabilize hydrocarbon free radicals by reacting them with hydrogen rather than allowing them to react with themselves. The primary purpose is not to change the boiling range of the feedstock. Hydrotreating is most often carried out using a fixed bed reactor, although other hydroprocessing reactors can also be used for hydrotreating, an example of which is an ebullated bed hydrotreater.

Of course, "hydrocracking" or "hydroconversion" may also involve the removal of sulfur and nitrogen from a feedstock as well as olefin saturation and other reactions typically associated with "hydrotreating". The terms "hydroprocessing" and "hydroconversion" shall broadly refer to both "hydrocracking" and "hydrotreating" processes, which define opposite ends of a spectrum, and everything in between along the spectrum.

The term "hydrocracking reactor" shall refer to any vessel in which hydrocracking (i.e., reducing the boiling range) of a feedstock in the presence of hydrogen and a hydrocracking catalyst is the primary purpose. Hydrocracking reactors are characterized as having an inlet port into which a heavy oil feedstock and hydrogen can be introduced, an outlet port from which an upgraded feedstock or material can be withdrawn, and sufficient thermal energy so as to form hydrocarbon free radicals in order to cause fragmentation of larger hydrocarbon molecules into smaller molecules. Examples of hydrocracking reactors include, but are not limited to, slurry phase reactors (i.e., a two phase, gas-liquid system), ebullated bed reactors (i.e., a three phase, gas-liquid-solid system), fixed bed reactors (i.e., a three-phase system that includes a liquid feed trickling downward over or flowing upward through a fixed bed of solid heterogeneous catalyst with hydrogen typically flowing cocurrently, but possibly countercurrently, to the heavy oil).

The term "hydrocracking temperature" shall refer to a minimum temperature required to cause significant hydrocracking of a heavy oil feedstock. In general, hydrocracking temperatures will preferably fall within a range of about 399° C. (750° F.) to about 460° C. (860° F.), more preferably in a range of about 418° C. (785° F.) to about 443° C. (830° F.), and most preferably in a range of about 421° C. (790° F.) to about 440° C. (825° F.).

The term "gas-liquid slurry phase hydrocracking reactor" shall refer to a hydroprocessing reactor that includes a continuous liquid phase and a gaseous dispersed phase, which forms a "slurry" of gaseous bubbles within the liquid phase. The liquid phase typically comprises a hydrocarbon feedstock that may contain a low concentration of dispersed metal sulfide catalyst particles, and the gaseous phase typically comprises hydrogen gas, hydrogen sulfide, and vaporized low boiling point hydrocarbon products. The liquid phase can optionally include a hydrogen donor solvent. The term "gas-liquid-solid, 3-phase slurry hydrocracking reactor" is used when a solid catalyst is employed along with liquid and gas. The gas may contain hydrogen, hydrogen sulfide and vaporized low boiling hydrocarbon products. The term "slurry phase reactor" shall broadly refer to both type of reactors (e.g., those with dispersed metal sulfide catalyst particles, those with a micron-sized or larger particulate catalyst, and those that include both).

The terms "solid heterogeneous catalyst", "heterogeneous catalyst" and "supported catalyst" shall refer to catalysts typically used in ebullated bed and fixed bed hydroprocessing systems, including catalysts designed primarily for hydrocracking, hydroconversion, hydrodemetallization, and/or hydrotreating. A heterogeneous catalyst typically comprises: (i) a catalyst support having a large surface area and interconnected channels or pores; and (ii) fine active catalyst particles, such as sulfides of cobalt, nickel, tungsten, and molybdenum dispersed within the channels or pores. The pores of the support are typically of limited size to maintain mechanical integrity of the heterogeneous catalyst and prevent breakdown and formation of excessive fines in the reactor. Heterogeneous catalysts can be produced as cylindrical pellets, cylindrical extrudates, other shapes such as trilobes, rings, saddles, or the like, or spherical solids.

The terms "dispersed metal sulfide catalyst particles" and "dispersed catalyst" shall refer to catalyst particles having a particle size that is less than 1 m (submicron), e.g., less than about 500 nm in diameter, or less than about 250 nm in diameter, or less than about 100 nm in diameter, or less than about 50 nm in diameter, or less than about 25 nm in diameter, or less than about 10 nm in diameter, or less than about 5 nm in diameter. The term "dispersed metal sulfide catalyst particles" may include molecular or molecularly-dispersed catalyst compounds. The term "dispersed metal sulfide catalyst particles" excludes metal sulfide particles and agglomerates of metal sulfide particles that are larger than 1 μm.

The term "molecularly-dispersed catalyst" shall refer to catalyst compounds that are essentially "dissolved" or dissociated from other catalyst compounds or molecules in a hydrocarbon feedstock or suitable diluent. It can include very small catalyst particles that contain a few catalyst molecules joined together (e.g., 15 molecules or less).

The terms "residual catalyst particles" shall refer to catalyst particles that remain with an upgraded material when transferred from one vessel to another (e.g., from a hydroprocessing reactor to a separator and/or other hydroprocessing reactor).

The term "conditioned feedstock" shall refer to a hydrocarbon feedstock into which a catalyst precursor has been combined and mixed sufficiently so that, upon decomposition of the catalyst precursor and formation of the active catalyst, the catalyst will comprise dispersed metal sulfide catalyst particles formed in situ within the feedstock.

The terms "upgrade", "upgrading" and "upgraded", when used to describe a feedstock that is being or has been subjected to hydroprocessing, or a resulting material or product, shall refer to one or more of a reduction in the molecular weight of the feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

The term "severity" generally refers to the amount of energy that is introduced into heavy oil during hydroprocessing and is often related to the operating temperature of the hydroprocessing reactor (i.e., higher temperature is related to higher severity; lower temperature is related to lower severity) in combination with the duration of said temperature exposure. Increased severity generally increases the quantity of conversion products produced by the hydroprocessing reactor, including both desirable products and undesirable conversion products. Desirable conversion products include hydrocarbons of reduced molecular weight, boiling point, and specific gravity, which can include end products such as naphtha, diesel, jet fuel, kerosene, wax, fuel oil, and the like. Other desirable conversion products include higher boiling hydrocarbons that can be further processed using conventional refining and/or distillation processes. Undesirable conversion products include coke, sediment, metals, and other solid materials that can deposit on hydroprocessing equipment and cause fouling, such as interior components of reactors, separators, filters, pipes, towers, heat exchangers, and the heterogeneous catalyst. Undesirable conversion products can also refer to unconverted resid that remains after distillation, such as atmospheric tower bottoms ("ATB") or vacuum tower bottoms ("VTB"). Minimizing undesirable conversion products reduces equipment fouling and shutdowns required to clean the equipment. Nevertheless, there may be a desirable amount of unconverted resid in order for downstream separation equipment to function properly and/or in order to provide a liquid transport medium for containing coke, sediment, metals, and other solid materials that might otherwise deposit on and foul equipment but that can be transported away by the remaining resid.

In addition to temperature, "severity" can be related to one or both of "conversion" and "throughput". Whether increased severity involves increased conversion and/or increased or decreased throughput may depend on the quality of the heavy oil feedstock and/or the mass balance of the overall hydroprocessing system. For example, where it is desired to convert a greater quantity of feed material and/or provide a greater quantity of material to downstream equipment, increased severity may primarily involve increased throughput without necessarily increasing fractional conversion. This can include the case where resid fractions (ATB and/or VTB) are sold as fuel oil and increased conversion without increased throughput might decrease the quantity of this product. In the case where it is desired to increase the ratio of upgraded materials to resid fractions, it may be desirable to primarily increase conversion without necessarily increasing throughput. Where the quality of heavy oil introduced into the hydroprocessing reactor fluctuates, it may be desirable to selectively increase or decrease one or both of conversion and throughput to maintain a desired ratio of upgraded materials to resid fractions and/or a desired absolute quantity or quantities of end product(s) being produced.

The terms "conversion" and "fractional conversion" refer to the proportion, often expressed as a percentage, of heavy oil that is converted into lower boiling and/or lower molecular weight materials. The conversion is expressed as a percentage of the initial resid content (i.e. components with boiling point greater than a defined residue cut point) which is converted to products with boiling point less than the defined cut point. The definition of residue cut point can vary, and can nominally include 524° C. (975° F.), 538° C. (1000° F.), 565° C. (1050° F.), and the like. It can be measured by distillation analysis of feed and product streams to determine the concentration of components with boiling point greater than the defined cut point. Fractional conversion is expressed as (F−P)/F, where F is the quantity of resid in the combined feed streams, and P is the quantity in the combined product streams, where both feed and product resid content are based on the same cut point definition. The quantity of resid is most often defined based on the mass of components with boiling point greater than the defined cut point, but volumetric or molar definitions could also be used.

The term "throughput" refers to the quantity of feed material that is introduced into the hydroprocessing reactor as a function of time. Throughput can be expressed in volumetric terms, such as barrels per day, or in mass terms, such as metric tons per hour. In common usage, throughput is defined as the mass or volumetric feed rate of only the heavy oil feedstock itself (for example, vacuum tower bottoms or the like). The definition does not normally include quantities of diluents or other components that may sometimes be included in the overall feeds to a hydroconversion unit, although a definition which includes those other components could also be used.

The "production rate of converted products" is an absolute rate that can be expressed in volumetric terms, such as barrels per day, or in mass terms, such as metric tons per hour. The "production rate of converted products" should not be confused with yield or efficiency, which are sometimes erroneously called "rate" (e.g., production rate per unit feed rate, or production rate per unit converted feed). It will be appreciated that the actual numeric values of both initial production rate of converted products and increased production rate of converted products are specific to an individual production facility and depend on the capacity of that facility. Therefore, it is valid to compare the production rate of the unit or facility in question before and after upgrading but not against a different unit or facility built with a different capacity.

II. Ebullated Bed Hydroprocessing Reactors and Systems

FIGS. 2A-2D schematically depict non-limiting examples of ebullated bed hydroprocessing reactors and systems used to hydroprocess hydrocarbon feedstocks such as heavy oil, which can be upgraded to use a dual catalyst system according to the invention. It will be appreciated that the example ebullated bed hydroprocessing reactors and systems can include interstage separation, integrated hydrotreating, and/or integrated hydrocracking.

Figure 2A:
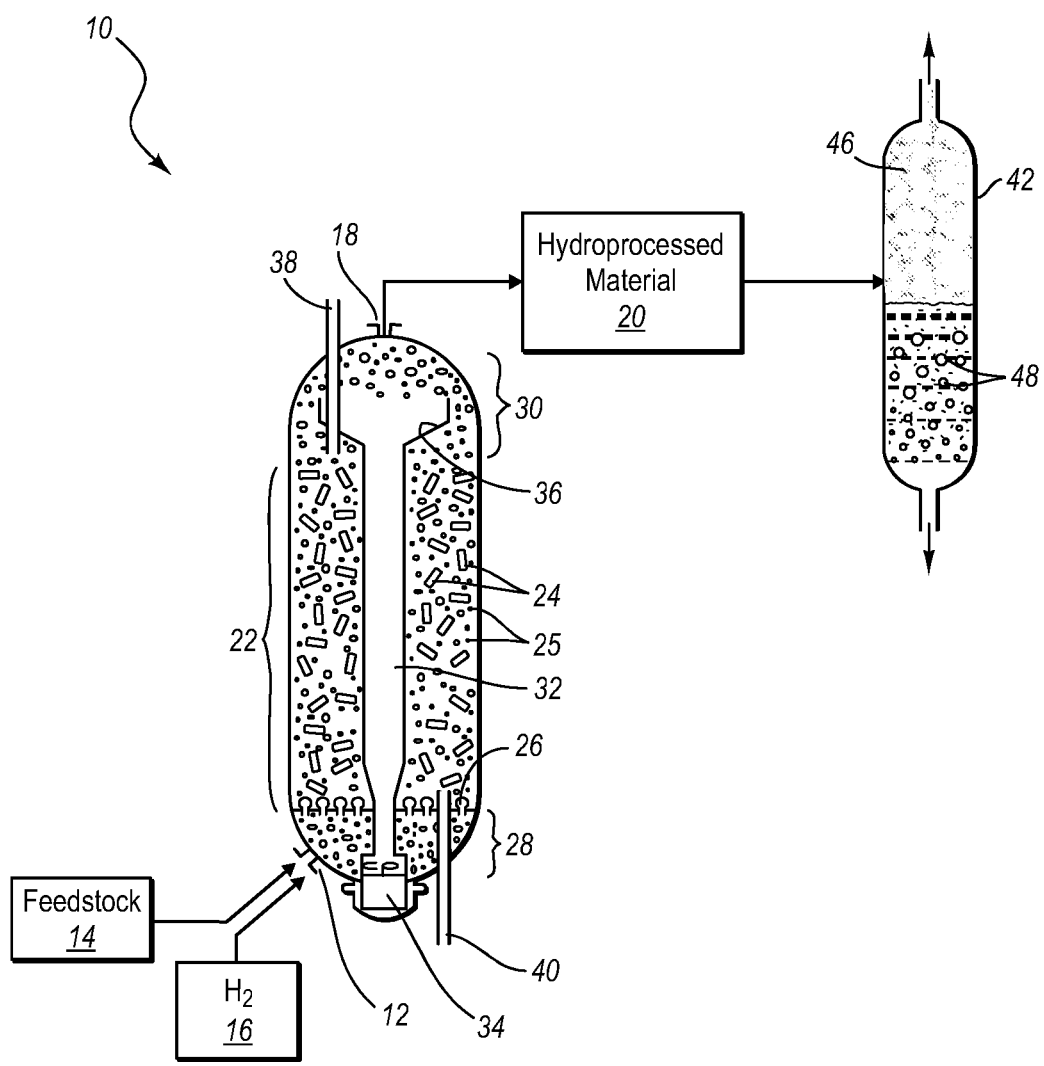
FIGS. 2A and 2B schematically illustrate exemplary ebullated bed reactors.

FIG. 2A schematically illustrates an ebullated bed hydroprocessing reactor 10 used in the LC-Fining hydrocracking system developed by C-E Lummus. Ebullated bed reactor 10 includes an inlet port 12 near the bottom, through which a feedstock 14 and pressurized hydrogen gas 16 are introduced, and an outlet port 18 at the top, through which hydroprocessed material 20 is withdrawn.

Reactor 10 further includes an expanded catalyst zone 22 comprising a heterogeneous catalyst 24 that is maintained in an expanded or fluidized state against the force of gravity by upward movement of liquid hydrocarbons and gas (schematically depicted as bubbles 25) through ebullated bed reactor 10. The lower end of expanded catalyst zone 22 is defined by a distributor grid plate 26, which separates expanded catalyst zone 22 from a lower heterogeneous catalyst free zone 28 located between the bottom of ebullated bed reactor 10 and distributor grid plate 26. Distributor grid plate 26 is configured to distribute the hydrogen gas and hydrocarbons evenly across the reactor and prevents heterogeneous catalyst 24 from falling by the force of gravity into lower heterogeneous catalyst free zone 28. The upper end of the expanded catalyst zone 22 is the height at which the downward force of gravity begins to equal or exceed the uplifting force of the upwardly moving feedstock and gas through ebullated bed reactor 10 as heterogeneous catalyst 24 reaches a given level of expansion or separation. Above expanded catalyst zone 22 is an upper heterogeneous catalyst free zone 30.

Hydrocarbons and other materials within the ebullated bed reactor 10 are continuously recirculated from upper heterogeneous catalyst free zone 30 to lower heterogeneous catalyst free zone 28 by means of a recycling channel 32 positioned in the center of ebullated bed reactor 10 connected to an ebullating pump 34 at the bottom of ebullated bed reactor 10. At the top of recycling channel 32 is a funnel-shaped recycle cup 36 through which feedstock is drawn from upper heterogeneous catalyst free zone 30. Material drawn downward through recycling channel 32 enters lower catalyst free zone 28 and then passes upwardly through distributor grid plate 26 and into expanded catalyst zone 22, where it is blended with freshly added feedstock 14 and hydrogen gas 16 entering ebullated bed reactor 10 through inlet port 12. Continuously circulating blended materials upward through the ebullated bed reactor 10 advantageously maintains heterogeneous catalyst 24 in an expanded or fluidized state within expanded catalyst zone 22, minimizes channeling, controls reaction rates, and keeps heat released by the exothermic hydrogenation reactions to a safe level.

Fresh heterogeneous catalyst 24 is introduced into ebullated bed reactor 10, such as expanded catalyst zone 22, through a catalyst inlet tube 38, which passes through the top of ebullated bed reactor 10 and directly into expanded catalyst zone 22. Spent heterogeneous catalyst 24 is withdrawn from expanded catalyst zone 22 through a catalyst withdrawal tube 40 that passes from a lower end of expanded catalyst zone 22 through distributor grid plate 26 and the bottom of ebullated bed reactor 10. It will be appreciated that the catalyst withdrawal tube 40 is unable to differentiate between fully spent catalyst, partially spent but active catalyst, and freshly added catalyst such that a random distribution of heterogeneous catalyst 24 is typically withdrawn from ebullated bed reactor 10 as "spent" catalyst.

Upgraded material 20 withdrawn from ebullated bed reactor 10 can be introduced into a separator 42 (e.g., hot separator, inter-stage pressure differential separator, or distillation tower, such as atmospheric or vacuum). The separator 42 separates one or more volatile fractions 46 from a non-volatile fraction 48.

Figure 2B:
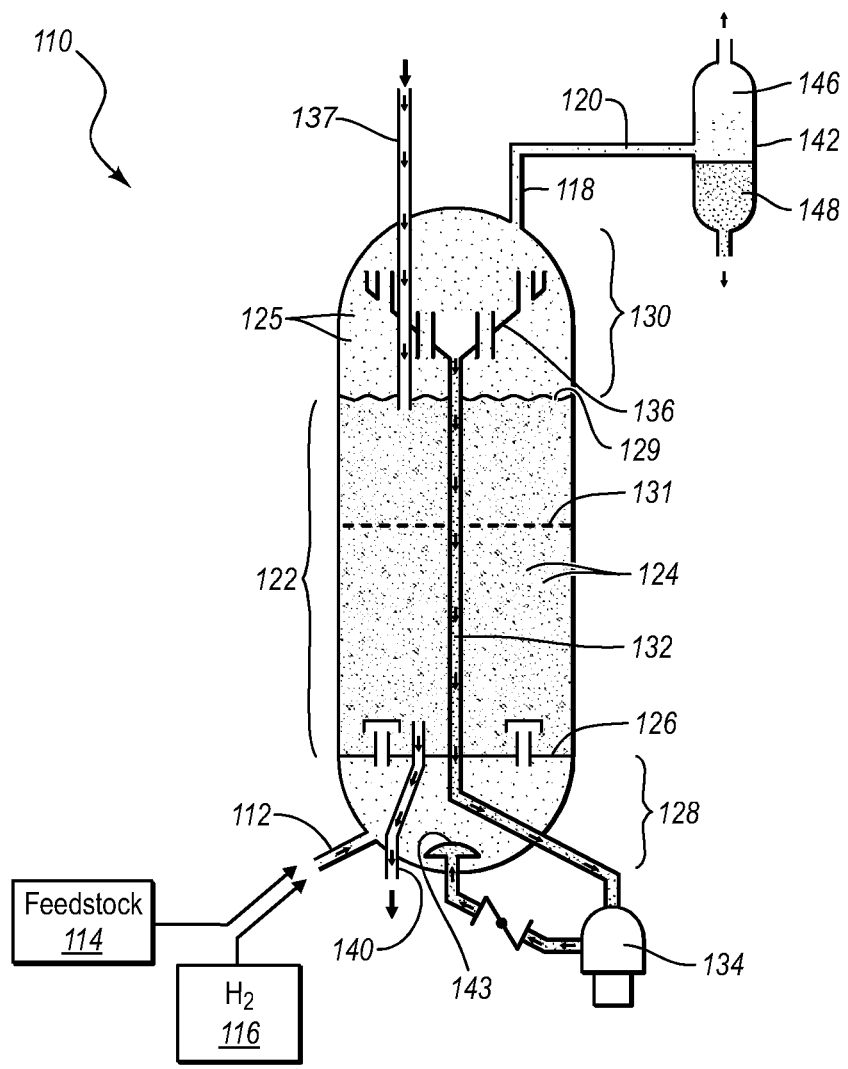

FIG. 2B schematically illustrates an ebullated bed reactor 110 used in the H-Oil hydrocracking system developed by Hydrocarbon Research Incorporated and currently licensed by Axens. Ebullated bed reactor 110 includes an inlet port 112, through which a heavy oil feedstock 114 and pressurized hydrogen gas 116 are introduced, and an outlet port 118, through which upgraded material 120 is withdrawn. An expanded catalyst zone 122 comprising a heterogeneous catalyst 124 is bounded by a distributor grid plate 126, which separates expanded catalyst zone 122 from a lower catalyst free zone 128 between the bottom of reactor 110 and distributor grid plate 126, and an upper end 129, which defines an approximate boundary between expanded catalyst zone 122 and an upper catalyst free zone 130. Dotted boundary line 131 schematically illustrates the approximate level of heterogeneous catalyst 124 when not in an expanded or fluidized state.

Materials are continuously recirculated within reactor 110 by a recycling channel 132 connected to an ebullating pump 134 positioned outside of reactor 110. Materials are drawn through a funnel-shaped recycle cup 136 from upper catalyst free zone 130. Recycle cup 136 is spiral-shaped, which helps separate hydrogen bubbles 125 from recycles material 132 to prevent cavitation of ebullating pump 134. Recycled material 132 enters lower catalyst free zone 128, where it is blended with fresh feedstock 116 and hydrogen gas 118, and the mixture passes up through distributor grid plate 126 and into expanded catalyst zone 122. Fresh catalyst 124 is introduced into expanded catalyst zone 122 through a catalyst inlet tube 137, and spent catalyst 124 is withdrawn from expanded catalyst zone 122 through a catalyst discharge tube 140.

The main difference between the H-Oil ebullated bed reactor 110 and the LC-Fining ebullated bed reactor 10 is the location of the ebullating pump. Ebullating pump 134 in H-Oil reactor 110 is located external to the reaction chamber. The recirculating feedstock is introduced through a recirculation port 141 at the bottom of reactor 110. The recirculation port 141 includes a distributor 143, which aids in evenly distributing materials through lower catalyst free zone 128. Upgraded material 120 is shown being sent to a separator 142, which separates one or more volatile fractions 146 from a non-volatile fraction 148.

Figure 2C:
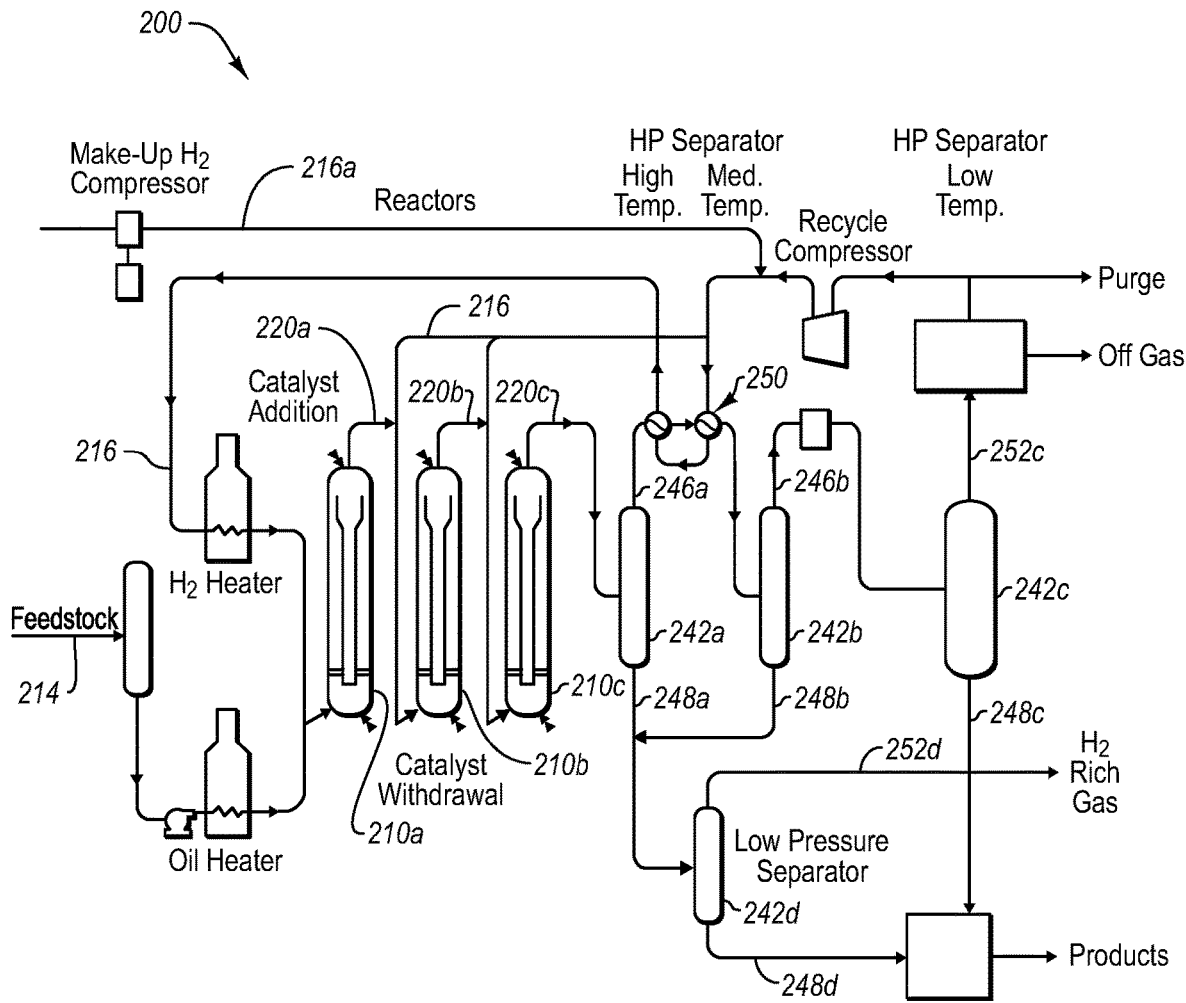
FIG. 2C schematically illustrates an exemplary ebullated bed hydroprocessing system comprising multiple ebullated bed reactors.

FIG. 2C schematically illustrates an ebullated bed hydroprocessing system 200 comprising multiple ebullated bed reactors. Hydroprocessing system 200, an example of which is an LC-Fining hydroprocessing unit, may include three ebullated bed reactors 210 in series for upgrading a feedstock 214. Feedstock 214 is introduced into a first ebullated bed reactor 210a together with hydrogen gas 216, both of which are passed through respective heaters prior to entering the reactor. Upgraded material 220a from first ebullated bed reactor 210a is introduced together with additional hydrogen gas 216 into a second ebullated bed reactor 210b. Upgraded material 220b from second ebullated bed reactor 210b is introduced together with additional hydrogen gas 216 into a third ebullated bed reactor 210c.

It should be understood that one or more interstage separators can optionally be interposed between first and second reactors 210a, 210b and/or second and third reactors 210b, 210c, in order to remove lower boiling fractions and gases from a non-volatile fraction containing liquid hydrocarbons and residual dispersed metal sulfide catalyst particles. It can be desirable to remove lower alkanes, such as hexanes and heptanes, which are valuable fuel products but poor solvents for asphaltenes. Removing volatile materials between multiple reactors enhances production of valuable products and increases the solubility of asphaltenes in the hydrocarbon liquid fraction fed to the downstream reactor (s). Both increase efficiency of the overall hydroprocessing system.

Upgraded material 220c from third ebullated bed reactor 210c is sent to a high temperature separator 242a, which separates volatile and non-volatile fractions. Volatile fraction 246a passes through a heat exchanger 250, which preheats hydrogen gas 216 prior to being introduced into first ebullated bed reactor 210a. The somewhat cooled volatile fraction 246a is sent to a medium temperature separator 242b, which separates a remaining volatile fraction 246b from a resulting liquid fraction 248b that forms as a result of cooling by heat exchanger 250. Remaining volatile fraction 246b is sent downstream to a low temperature separator 246c for further separation into a gaseous fraction 252c and a degassed liquid fraction 248c.

A liquid fraction 248a from high temperature separator 242a is sent together with resulting liquid fraction 248b from medium temperature separator 242b to a low pressure separator 242d, which separates a hydrogen rich gas 252d from a degassed liquid fraction 248d, which is then mixed with the degassed liquid fraction 248c from low temperature separator 242c and fractionated into products. Gaseous fraction 252c from low temperature separator 242c is purified into off gas, purge gas, and hydrogen gas 216. Hydrogen gas 216 is compressed, mixed with make-up hydrogen gas 216a, and either passed through heat exchanger 250 and introduced into first ebullated bed reactor 210a together with feedstock 216 or introduced directly into second and third ebullated bed reactors 210b and 210b.

Figure 2D:
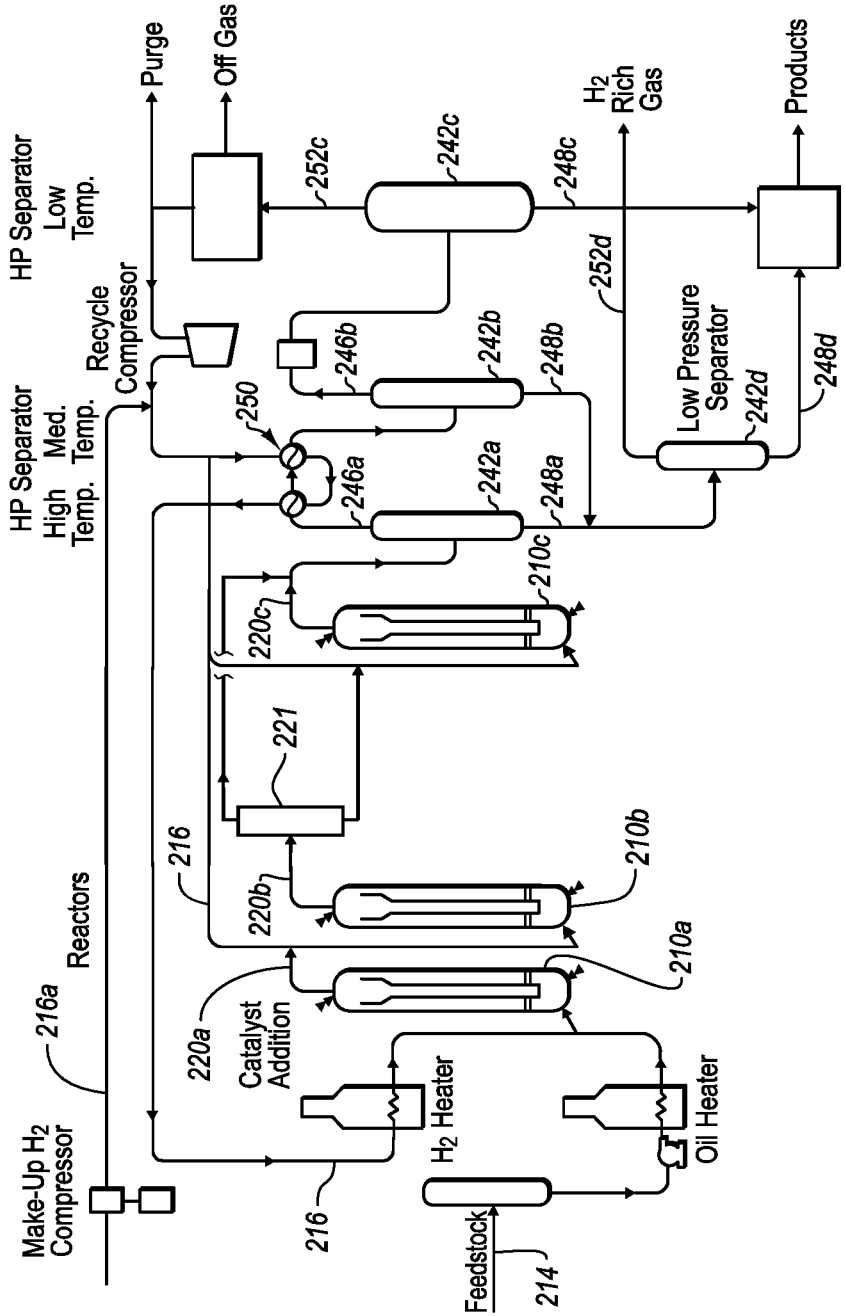
FIG. 2D schematically illustrates an exemplary ebullated bed hydroprocessing system comprising multiple ebullated bed reactors and an interstage separator between two of the reactors.

FIG. 2D schematically illustrates an ebullated bed hydroprocessing system 200 comprising multiple ebullated bed reactors, similar to the system illustrated in FIG. 2C, but showing an interstage separator 221 interposed between second and third reactors 210b, 210c (although interstage separator 221 may be interposed between first and second reactors 210a, 210b). As illustrated, the effluent from second-stage reactor 210b enters interstage separator 221, which can be a high-pressure, high-temperature separator. The liquid fraction from separator 221 is combined with a portion of the recycle hydrogen from line 216 and then enters third-stage reactor 210c. The vapor fraction from the interstage separator 221 bypasses third-stage reactor 210c, mixes with effluent from third-stage reactor 210c, and then passes into a high-pressure, high-temperature separator 242a.

This allows lighter, more-saturated components formed in the first two reactor stages to bypass third-stage reactor 210c. The benefits of this are (1) a reduced vapor load on the third-stage reactor, which increases the volume utilization of the third-stage reactor for converting the remaining heavy components, and (2) a reduced concentration of "anti-solvent" components (saturates) which can destabilize asphaltenes in third-stage reactor 210c.

In preferred embodiments, the hydroprocessing systems are configured and operated to promote hydrocracking reactions rather than mere hydrotreating, which is a less severe form of hydroprocessing. Hydrocracking involves the breaking of carbon-carbon molecular bonds, such as reducing the molecular weight of larger hydrocarbon molecules and/or ring opening of aromatic compounds. Hydrotreating, on the other hand, mainly involves hydrogenation of unsaturated hydrocarbons, with minimal or no breaking of carbon-carbon molecular bonds. To promote hydrocracking rather than mere hydrotreating reactions, the hydroprocessing reactor(s) are preferably operated at a temperature in a range of about 750° F. (399° C.) to about 860° F. (460° C.), more preferably in a range of about 780° F. (416° C.) to about 830° F. (443° C.), are preferably operated at a pressure in a range of about 1000 psig (6.9 MPa) to about 3000 psig (20.7 MPa), more preferably in a range of about 1500 psig (10.3 MPa) to about 2500 psig (17.2 MPa), and are preferably operated at a space velocity (e.g., Liquid Hourly Space Velocity, or LHSV, defined as the ratio of feed volume to reactor volume per hour) in a range of about 0.05 hr$^{-1}$ to about 0.45 hr$^{-1}$, more preferably in a range of about 0.15 hr$^{-1}$ to about 0.35 hr$^{-1}$. The difference between hydrocracking and hydrotreating can also be expressed in terms of resid conversion (wherein hydrocracking results in the substantial conversion of higher boiling to lower boiling hydrocarbons, while hydrotreating does not). The hydroprocessing systems disclosed herein can result in a resid conversion in a range of about 40% to about 90%, preferably in a range of about 55% to about 80%. The preferred conversion range typically depends on the type of feedstock because of differences in processing difficulty between different feedstocks. Typically, conversion will be at least about 5% higher, preferably at least about 10% higher, compared to operating an ebullated bed reactor prior to upgrading to utilize a dual catalyst system as disclosed herein.

III. Upgrading an Ebullated Bed Hydroprocessing Reactor

FIGS. 3A, 3B, 3C, and 3D are flow diagrams which illustrate exemplary methods for upgrading an ebullated bed reactor to use a dual catalyst system and produce less fouling sediment.

Figure 3A:
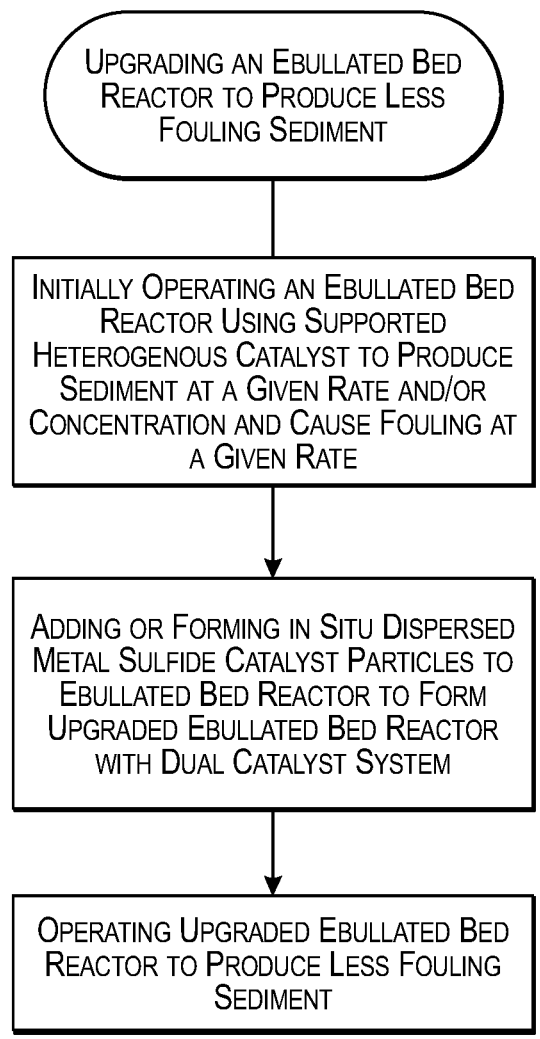
FIG. 3A is a flow diagram illustrating an exemplary method for upgrading an ebullated bed reactor to produce less fouling sediment.

FIG. 3A more particularly illustrates a method comprising: (A) initially operating an ebullated bed reactor using a heterogeneous catalyst to hydroprocess heavy oil at initial conditions and produce sediment and cause fouling at a given rate; (B) adding or forming in situ dispersed metal sulfide catalyst particles to the ebullated bed reactor to form an upgraded reactor with a dual catalyst system; and (C) operating the upgraded ebullated bed reactor using the dual catalyst system to produce less fouling sediment than when initially operating the ebullated bed reactor.

According to some embodiments, the heterogeneous catalyst utilized when initially operating the ebullated bed reactor at an initial condition is a commercially available catalyst typically used in ebullated bed reactor systems. To maximize efficiency, the initial reactor conditions are advantageously at a level at which sediment formation and equipment fouling are maintained within acceptable levels. Increasing sediment formation (absolute production rate and/or increased wt % of sediment in at least one process stream) without upgrading the ebullated reactor to use a dual catalyst system may therefore result in increased equipment fouling, which would otherwise require more frequent shutdown and cleaning of the hydroprocessing reactor and related equipment, such as pipes, towers, heaters, heat exchangers, heterogeneous catalyst and/or separation equipment.

In order to produce less fouling sediment, such as by increasing the rate of production of converted products and/or sediment production rate and/or sediment concentration in at least one process stream (e.g., by increasing reactor severity and/or rate of production of converted products) without increasing equipment fouling and the need for more frequent shutdown and maintenance, the ebullated bed reactor is upgraded to use a dual catalyst system comprising a heterogeneous catalyst and dispersed metal sulfide catalyst particles. Operating the upgraded ebullated bed reactor to produce less fouling sediment may involve operating with increased conversion and/or increased throughput than when operating at the initial conditions. Both typically involve operating the upgraded reactor at an increased temperature and increase sediment production and rate of equipment fouling. However, producing less fouling sediment results in less equipment fouling and lower frequency of shutdowns and cleaning when sediment is produced at a given rate or wt % in a process stream.

In one implementation, a method of upgrading an ebullated bed hydroprocessing system that includes one or more ebullated bed reactors to produce less fouling sediment, comprises: (1) operating an ebullated bed reactor using a heterogeneous catalyst to hydroprocess heavy oil at initial conditions, including an initial production rate of converted products, an initial sediment production rate and/or concentration in a process stream, and an initial rate of equipment fouling; (2) thereafter upgrading the ebullated bed reactor to operate using a dual catalyst system comprised of dispersed metal sulfide catalyst particles and heterogeneous catalyst; and (3) operating the upgraded ebullated bed reactor using the dual catalyst system to produce less fouling sediment, resulting in less equipment fouling at a given sediment production rate and/or concentration compared to when operating the ebullated bed reactor at the initial conditions.

In one implementation, operating the upgraded ebullated bed reactor using the dual catalyst system to produce less fouling sediment comprises: (i) producing converted products at a same or similar rate as the initial production rate of converted products when operating at the initial conditions; (ii) producing sediment at a reduced rate and/or concentration in a process stream compared to the initial sediment production rate and/or concentration when operating at the initial conditions; and (iii) equipment fouling occurring at a reduced rate compared to the initial rate of equipment fouling when operating at the initial conditions, and wherein the rate of equipment fouling is reduced by a greater degree than the reduction in sediment production rate and/or concentration.

In another implementation, operating the upgraded ebullated bed reactor using the dual catalyst system to produce less fouling sediment comprises: (i) producing converted products at a higher rate than the initial production rate of converted products when operating at the initial conditions; (ii) producing sediment at a rate and/or concentration in a process stream that is no higher than the initial sediment production rate and/or concentration when operating at the initial conditions; and (iii) equipment fouling occurring at a reduced rate compared to the initial rate of equipment fouling when operating at the initial conditions.

In yet another implementation, operating the upgraded ebullated bed reactor using the dual catalyst system to produce less fouling sediment comprises: (i) producing converted products at a higher rate than the initial production rate of converted products when operating at the initial conditions; (ii) producing sediment at a higher rate and/or concentration than the initial sediment production rate and/or concentration when operating at the initial conditions; and (iii) equipment fouling occurring at a rate that is no higher than the initial rate of equipment fouling when operating at the initial conditions.

In one implementation, the production rate of converted products is increased, when operating the upgraded ebullated bed reactor using the dual catalyst system, by at least one of: (i) higher temperature and higher conversion at same or similar throughput as when operating at the initial conditions; (ii) higher temperature and higher throughput at same or similar conversion as when operating at the initial conditions; or (iii) higher temperature, higher throughput, and higher conversion than when operating at the initial conditions. In some embodiments, throughput can be increased by at least 2.5%, at least 5%, at least 10%, or at least 20% when operating the upgraded ebullated bed reactor than when operating at the initial conditions. In some embodiments, conversion can be increased by at least 2.5%, at least 5%, at least 7.5%, at least 10%, or at least 15% when operating the upgraded ebullated bed reactor than when operating at the initial conditions. In some embodiments, temperature can be increased by at least 2.5° C., at least 5° C., at least 7.5° C., or at least 10° C. when operating the upgraded ebullated bed reactor than when operating at the initial conditions.

In some embodiments, after upgrading the ebullated bed reactor to use the dual catalyst system the sediment production rate and/or concentration in a process stream is maintained or increased compared to the initial sediment production rate and/or concentration, and the rate of equipment fouling is decreased by at least 5%, 25%, 50%, or 75% compared to the initial rate of equipment fouling. In some embodiments, after upgrading to use the dual catalyst system the sediment production rate is increased by at least 2%, 10%, 20%, or 33% compared to the initial sediment production rate and the rate of equipment fouling is maintained or decreased compared to the initial rate of equipment fouling. In some embodiments, after upgrading to use the dual catalyst system the sediment concentration in a process stream is increased by at least 2%, 10%, 20%, or 33% compared to the initial sediment concentration and the rate of equipment fouling is maintained or decreased compared to the initial rate of equipment fouling. In some embodiments, after upgrading to use the dual catalyst system the sediment production rate is reduced by at least 2%, 10%, 30%, or 50% compared to the initial sediment production rate and the rate of equipment fouling is reduced by an even greater percentage compared to the initial rate of equipment fouling. In some embodiments, after upgrading to use the dual catalyst system the sediment concentration in a process stream is reduced by at least 2%, 10%, 30%, or 50% compared to the initial sediment concentration and the rate of equipment fouling is reduced by an even greater percentage compared to the initial rate of equipment fouling.

Figure 3B:
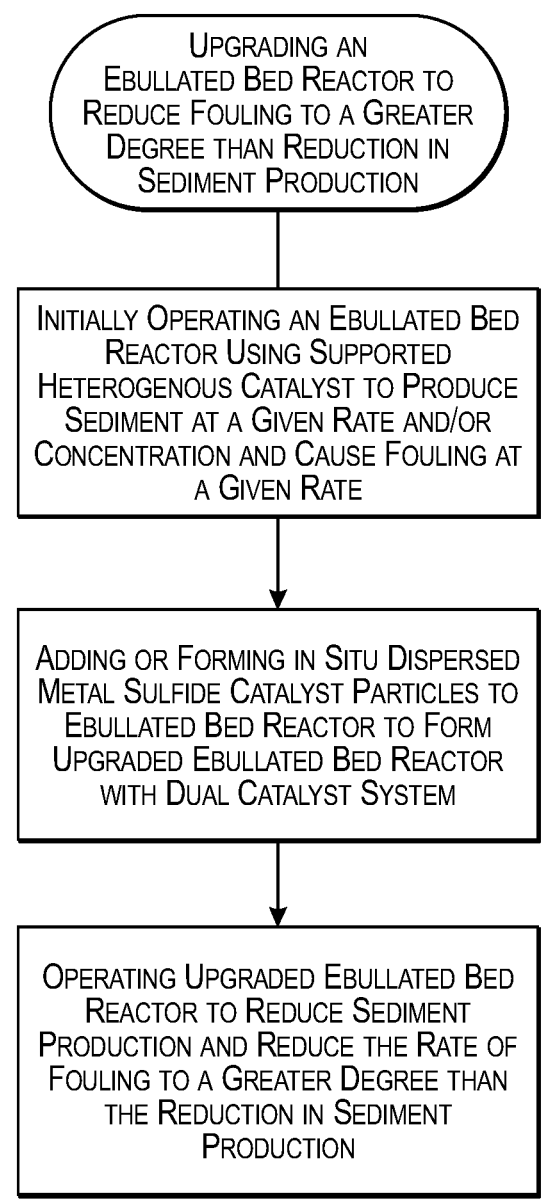
FIG. 3B is a flow diagram illustrating an exemplary method for upgrading an ebullated bed reactor to reduce the rate of equipment fouling to a greater degree than the reduction in the sediment production rate and/or concentration in a process stream.

FIG. 3B is a flow diagram illustrating an exemplary method for upgrading an ebullated bed reactor to reduce equipment fouling by a greater degree than the reduction in sediment production, which is an embodiment of the method illustrated in FIG. 3A. FIG. 3B more particularly illustrates a method comprising: (A) initially operating an ebullated bed reactor using a heterogeneous catalyst to hydroprocess heavy oil at initial conditions to produce sediment at a given rate or concentration in a process stream and cause equipment fouling at a given rate; (B) adding or forming in situ dispersed metal sulfide catalyst particles to the ebullated bed reactor to form an upgraded reactor with a dual catalyst system; and (C) operating the upgraded ebullated bed reactor using the dual catalyst system to reduce sediment production rate and/or concentration and reduce the rate of equipment fouling by a greater percentage than the percent reduction in sediment production rate or concentration.

In one implementation, a method of upgrading an ebullated bed hydroprocessing system that includes one or more ebullated bed reactors to produce less fouling sediment, comprises: (1) operating an ebullated bed reactor using a heterogeneous catalyst to hydroprocess heavy oil at initial conditions, including an initial sediment production rate and/or concentration in a process stream and an initial rate of equipment fouling; (2) thereafter upgrading the ebullated bed reactor to operate using a dual catalyst system comprised of dispersed metal sulfide catalyst particles and heterogeneous catalyst; and (3) operating the upgraded ebullated bed reactor using the dual catalyst system with a reduced sediment production rate and/or concentration and a reduced rate of equipment fouling with a degree of reduction that is greater than the reduction in the sediment production rate and/or concentration. In some embodiments, operating the upgraded ebullated bed reactor includes reducing the sediment production rate and/or concentration in a process stream by at least at least 2%, 10%, 30%, or 50% compared to the initial sediment production rate and/or concentration and reducing the rate of equipment fouling by at least 5%, 25%, 50%, or 75% compared to the initial rate of equipment fouling.

Figure 3C:
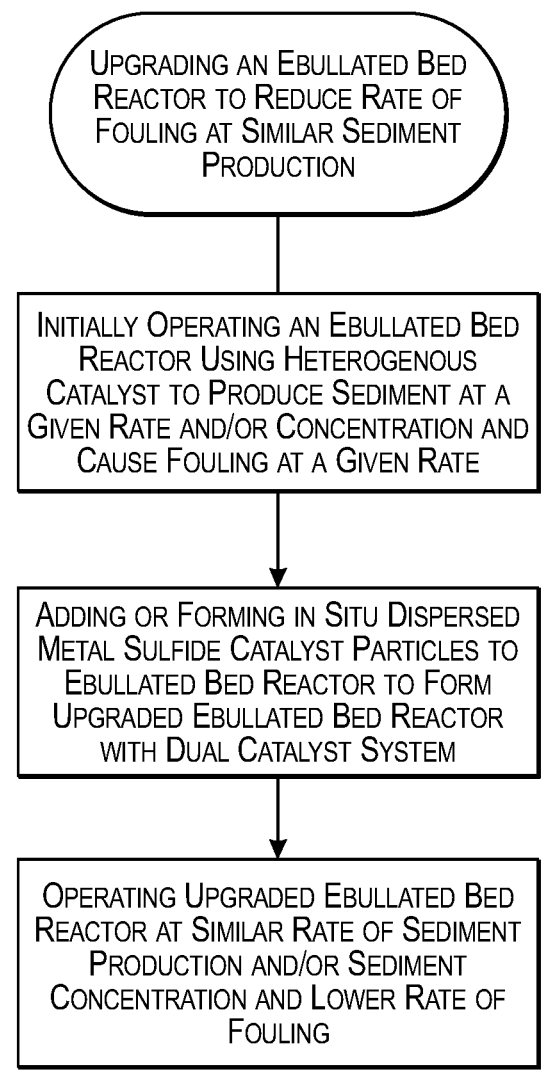
FIG. 3C is a flow diagram illustrating an exemplary method for upgrading an ebullated bed reactor to reduce the rate of equipment fouling at similar sediment production rate and/or concentration in a process stream.

FIG. 3C is a flow diagram illustrating an exemplary method for upgrading an ebullated bed reactor to reduce equipment fouling at similar sediment production, which is an embodiment of the method illustrated in FIG. 3A. FIG. 3C more particularly illustrates a method comprising: (A) initially operating an ebullated bed reactor using a heterogeneous catalyst to hydroprocess heavy oil at initial conditions to produce sediment at a given rate and/or concentration in a process stream and cause equipment fouling at a given rate; (B) adding or forming in situ dispersed metal sulfide catalyst particles to the ebullated bed reactor to form an upgraded reactor with a dual catalyst system; and (C) operating the upgraded ebullated bed reactor using the dual catalyst system at the same or similar sediment production rate and/or concentration and a lower rate of equipment fouling.

In one implementation, a method of upgrading an ebullated bed hydroprocessing system that includes one or more ebullated bed reactors to produce less fouling sediment, comprises: (1) operating an ebullated bed reactor using a heterogeneous catalyst to hydroprocess heavy oil at initial conditions, including an initial sediment production rate and/or concentration in a process stream and an initial rate of equipment fouling; (2) thereafter upgrading the ebullated bed reactor to operate using a dual catalyst system comprised of dispersed metal sulfide catalyst particles and heterogeneous catalyst; and (3) operating the upgraded ebullated bed reactor using the dual catalyst system at the same or similar sediment production rate and/or concentration and at a reduced rate of equipment fouling. In some embodiments, operating the upgraded ebullated bed reactor includes reducing the rate of equipment fouling by at least 5%, 25%, 50%, or 75% compared to the initial rate of equipment fouling.

Figure 3D:
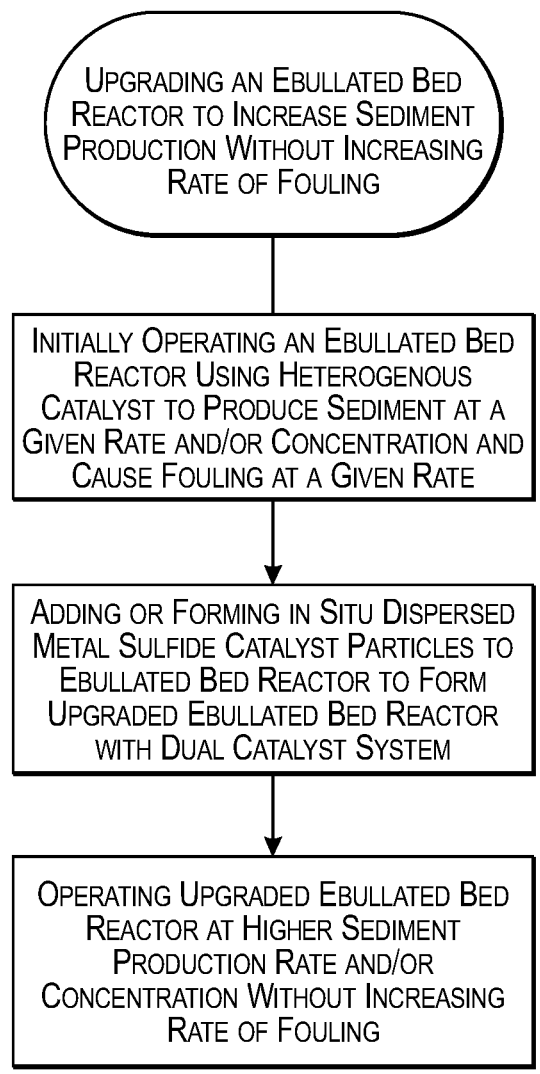
FIG. 3D is a flow diagram illustrating an exemplary method for upgrading an ebullated bed reactor to increase the sediment production rate and/or sediment concentration in a process stream without increasing the rate of equipment fouling.

FIG. 3D is a flow diagram illustrating an exemplary method for upgrading an ebullated bed reactor to increase sediment production without increasing the rate of equipment fouling, which is an embodiment of the method illustrated in FIG. 3A. FIG. 3D more particularly illustrates a method comprising: (A) initially operating an ebullated bed reactor using a heterogeneous catalyst to hydroprocess heavy oil at initial conditions to produce sediment at a given rate and/or concentration in a process stream and cause equipment fouling at a given rate; (B) adding or forming in situ dispersed metal sulfide catalyst particles to the ebullated bed reactor to form an upgraded reactor with a dual catalyst system; and (C) operating the upgraded ebullated bed reactor using the dual catalyst system at a higher sediment production rate and/or concentration without increasing the rate of equipment fouling.

In one implementation, a method of upgrading an ebullated bed hydroprocessing system that includes one or more ebullated bed reactors to produce less fouling sediment, comprises: (1) operating an ebullated bed reactor using a heterogeneous catalyst to hydroprocess heavy oil at initial conditions, including an initial sediment production rate and/or concentration in a process stream and an initial rate of equipment fouling; (2) thereafter upgrading the ebullated bed reactor to operate using a dual catalyst system comprised of dispersed metal sulfide catalyst particles and heterogeneous catalyst; and (3) operating the upgraded ebullated bed reactor using the dual catalyst system at a higher sediment production rate and/or concentration and the same or lower rate of equipment fouling. In some embodiments, operating the upgraded the ebullated bed reactor includes increasing the sediment production rate and/or concentration of sediment in a process stream by at least 2%, 10%, 20%, or 33% compared to the initial sediment production rate and/or concentration.

The dispersed metal sulfide catalyst particles can be generated separately and then added to the ebullated bed reactor when forming the dual catalyst system. Alternatively or in addition, at least a portion of the dispersed metal sulfide catalyst particles can be generated in situ within the ebullated bed reactor.

In some embodiments, the dispersed metal sulfide catalyst particles are advantageously formed in situ within an entirety of a heavy oil feedstock. This can be accomplished by initially mixing a catalyst precursor with an entirety of the heavy oil feedstock to form a conditioned feedstock and thereafter heating the conditioned feedstock to decompose the catalyst precursor and cause or allow catalyst metal to react with sulfur and/or sulfur-containing molecules in and/or added to the heavy oil to form the dispersed metal sulfide catalyst particles.

The catalyst precursor can be oil soluble and have a decomposition temperature in a range from about 100° C. (212° F.) to about 350° C. (662° F.), or in a range of about 150° C. (302° F.) to about 300° C. (572° F.), or in a range of about 175° C. (347° F.) to about 250° C. (482° F.). Example catalyst precursors include organometallic complexes or compounds, more specifically oil soluble compounds or complexes of transition metals and organic acids, having a decomposition temperature or range high enough to avoid substantial decomposition when mixed with a heavy oil feedstock under suitable mixing conditions. When mixing the catalyst precursor with a hydrocarbon oil diluent, it is advantageous to maintain the diluent at a temperature below which significant decomposition of the catalyst precursor occurs. One of skill in the art can, following the present disclosure, select a mixing temperature profile that results in intimate mixing of a selected precursor composition without substantial decomposition prior to formation of the dispersed metal sulfide catalyst particles.

Example catalyst precursors include, but are not limited to, molybdenum 2-ethylhexanoate, molybdenum octoate, molybdenum naphthanate, vanadium naphthanate, vanadium octoate, molybdenum hexacarbonyl, vanadium hexacarbonyl, and iron pentacarbonyl. Other catalyst precursors include molybdenum salts comprising a plurality of cationic molybdenum atoms and a plurality of carboxylate anions of at least 8 carbon atoms and that are at least one of (a) aromatic, (b) alicyclic, or (c) branched, unsaturated and aliphatic. By way of example, each carboxylate anion may have between 8 and 17 carbon atoms or between 11 and 15 carbon atoms. Examples of carboxylate anions that fit at least one of the foregoing categories include carboxylate anions derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), and combinations thereof.

In other embodiments, carboxylate anions for use in making oil soluble, thermally stable, molybdenum catalyst precursor compounds are derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), 10-undecenoic acid, dodecanoic acid, and combinations thereof. It has been discovered that molybdenum catalyst precursors made using carboxylate anions derived from the foregoing carboxylic acids possess improved thermal stability.

Catalyst precursors with higher thermal stability can have a first decomposition temperature higher than 210° C., higher than about 225° C., higher than about 230° C., higher than about 240° C., higher than about 275° C., or higher than about 290° C. Such catalyst precursors can have a peak decomposition temperature higher than 250° C., or higher than about 260° C., or higher than about 270° C., or higher than about 280° C., or higher than about 290° C., or higher than about 330° C.

One of skill in the art can, following the present disclosure, select a mixing temperature profile that results in intimate mixing of a selected precursor composition without substantial decomposition prior to formation of the dispersed metal sulfide catalyst particles.

Whereas it is within the scope of the invention to directly blend the catalyst precursor composition with the heavy oil feedstock, care must be taken in such cases to mix the components for a time sufficient to thoroughly blend the precursor composition within the feedstock before substantial decomposition of the precursor composition has occurred. For example, U.S. Pat. No. 5,578,197 to Cyr et al., the disclosure of which is incorporated by reference, describes a method whereby molybdenum 2-ethyl hexanoate was mixed with bitumen vacuum tower residuum for 24 hours before the resulting mixture was heated in a reaction vessel to form the catalyst compound and to effect hydrocracking (see col. 10, lines 4-43). Whereas 24-hour mixing in a testing environment may be entirely acceptable, such long mixing times may make certain industrial operations prohibitively expensive. To ensure thorough mixing of the catalyst precursor within the heavy oil prior to heating to form the active catalyst, a series of mixing steps are performed by different mixing apparatus prior to heating the conditioned feedstock. These may include one or more low shear in-line mixers, followed by one or more high shear mixers, followed by a surge vessel and pump-around system, followed by one or more multi-stage high pressure pumps used to pressurize the feed stream prior to introducing it into a hydroprocessing reactor.

In some embodiments, the conditioned feedstock is preheated using a heating apparatus prior to entering the hydroprocessing reactor in order to form at least a portion of the dispersed metal sulfide catalyst particles in situ within the heavy oil. In other embodiments, the conditioned feedstock is heated or further heated in the hydroprocessing reactor in order to form at least a portion of the dispersed metal sulfide catalyst particles in situ within the heavy oil.

In some embodiments, the dispersed metal sulfide catalyst particles can be formed in a multi-step process. For example, an oil soluble catalyst precursor composition can be pre-mixed with a hydrocarbon diluent to form a diluted precursor mixture. Examples of suitable hydrocarbon diluents include, but are not limited to, vacuum gas oil (which typically has a nominal boiling range of 360-524° C.) (680-975° F.), decant oil or cycle oil (which typically has a nominal boiling range of 360°-550° C.) (680-1022° F.), and gas oil (which typically has a nominal boiling range of 200°-360° C.) (392-680° F.), a portion of the heavy oil feedstock, and other hydrocarbons that nominally boil at a temperature higher than about 200° C.

The ratio of catalyst precursor to hydrocarbon oil diluent used to make the diluted precursor mixture can be in a range of about 1:500 to about 1:1, or in a range of about 1:150 to about 1:2, or in a range of about 1:100 to about 1:5 (e.g., 1:100, 1:50, 1:30, or 1:10).

The amount of catalyst metal (e.g., molybdenum) in the diluted precursor mixture is preferably in a range of about 100 ppm to about 7000 ppm by weight of the diluted precursor mixture, more preferably in a range of about 300 ppm to about 4000 ppm by weight of the diluted precursor mixture.

The catalyst precursor is advantageously mixed with the hydrocarbon diluent below a temperature at which a significant portion of the catalyst precursor composition decomposes. The mixing may be performed at temperature in a range of about 25° C. (77° F.) to about 250° C. (482° F.), or in range of about 50° C. (122° F.) to about 200° C. (392° F.), or in a range of about 75° C. (167° F.) to about 150° C. (302° F.), to form the diluted precursor mixture. The temperature at which the diluted precursor mixture is formed may depend on the decomposition temperature and/or other characteristics of the catalyst precursor that is utilized and/or characteristics of the hydrocarbon diluent, such as viscosity.

The catalyst precursor is preferably mixed with the hydrocarbon oil diluent for a time period in a range of about 0.1 second to about 5 minutes, or in a range of about 0.5 second to about 3 minutes, or in a range of about 1 second to about 1 minute. The actual mixing time is dependent, at least in part, on the temperature (i.e., which affects the viscosity of the fluids) and mixing intensity. Mixing intensity is dependent, at least in part, on the number of stages e.g., for an in-line static mixer.

Pre-blending the catalyst precursor with a hydrocarbon diluent to form a diluted precursor mixture which is then blended with the heavy oil feedstock greatly aids in thoroughly and intimately blending the catalyst precursor within the feedstock, particularly in the relatively short period of time required for large-scale industrial operations. Forming a diluted precursor mixture shortens the overall mixing time by (1) reducing or eliminating differences in solubility between a more polar catalyst precursor and a more hydrophobic heavy oil feedstock, (2) reducing or eliminating differences in rheology between the catalyst precursor and heavy oil feedstock, and/or (3) breaking up catalyst precursor molecules to form a solute within the hydrocarbon diluent that is more easily dispersed within the heavy oil feedstock.

The diluted precursor mixture is then combined with the heavy oil feedstock and mixed for a time sufficient and in a manner so as to disperse the catalyst precursor throughout the feedstock to form a conditioned feedstock in which the catalyst precursor is thoroughly mixed within the heavy oil prior to thermal decomposition and formation of the active metal sulfide catalyst particles. In order to obtain sufficient mixing of the catalyst precursor within the heavy oil feedstock, the diluted precursor mixture and heavy oil feedstock are advantageously mixed for a time period in a range of about 0.1 second to about 5 minutes, or in a range from about 0.5 second to about 3 minutes, or in a range of about 1 second to about 3 minutes. Increasing the vigorousness and/or shearing energy of the mixing process generally reduce the time required to effect thorough mixing.

Examples of mixing apparatus that can be used to effect thorough mixing of the catalyst precursor and/or diluted precursor mixture with heavy oil include, but are not limited to, high shear mixing such as mixing created in a vessel with a propeller or turbine impeller; multiple static in-line mixers; multiple static in-line mixers in combination with in-line high shear mixers; multiple static in-line mixers in combination with in-line high shear mixers followed by a surge vessel; combinations of the above followed by one or more multi-stage centrifugal pumps; and one or more multi-stage centrifugal pumps. According to some embodiments, continuous rather than batch-wise mixing can be carried out using high energy pumps having multiple chambers within which the catalyst precursor composition and heavy oil feedstock are churned and mixed as part of the pumping process itself. The foregoing mixing apparatus may also be used for the pre-mixing process discussed above in which the catalyst precursor is mixed with the hydrocarbon diluent to form the catalyst precursor mixture.

In the case of heavy oil feedstocks that are solid or extremely viscous at room temperature, such feedstocks may advantageously be heated in order to soften them and create a feedstock having sufficiently low viscosity so as to allow good mixing of the oil soluble catalyst precursor into the feedstock composition. In general, decreasing the viscosity of the heavy oil feedstock will reduce the time required to effect thorough and intimate mixing of the oil soluble precursor composition within the feedstock.

The heavy oil feedstock and catalyst precursor and/or diluted precursor mixture are advantageously mixed at a temperature in a range of about 25° C. (77° F.) to about 350° C. (662° F.), or in a range of about 50° C. (122° F.) to about 300° C. (572° F.), or in a range of about 75° C. (167° F.) to about 250° C. (482° F.) to yield a conditioned feedstock.

In the case where the catalyst precursor is mixed directly with the heavy oil feedstock without first forming a diluted precursor mixture, it may be advantageous to mix the catalyst precursor and heavy oil feedstock below a temperature at which a significant portion of the catalyst precursor composition decomposes. However, in the case where the catalyst precursor is premixed with a hydrocarbon diluent to form a diluted precursor mixture, which is thereafter mixed with the heavy oil feedstock, it may be permissible for the heavy oil feedstock to be at or above the decomposition temperature of the catalyst precursor. That is because the hydrocarbon diluent shields the individual catalyst precursor molecules and prevents them from agglomerating to form larger particles, temporarily insulates the catalyst precursor molecules from heat from the heavy oil during mixing, and facilitates dispersion of the catalyst precursor molecules sufficiently quickly throughout the heavy oil feedstock before decomposing to liberate metal. In addition, additional heating of the feedstock may be necessary to liberate hydrogen sulfide from sulfur-bearing molecules in the heavy oil to form the metal sulfide catalyst particles. In this way, progressive dilution of the catalyst precursor permits a high level of dispersion within the heavy oil feedstock, resulting in the formation of highly dispersed metal sulfide catalyst particles, even where the feedstock is at a temperature above the decomposition temperature of the catalyst precursor.

After the catalyst precursor has been well-mixed throughout the heavy oil to yield a conditioned feedstock, this composition is then heated to cause decomposition of the catalyst precursor to liberate catalyst metal therefrom, cause or allow it to react with sulfur within and/or added to the heavy oil, and form the active metal sulfide catalyst particles. Metal from the catalyst precursor may initially form a metal oxide, which then reacts with sulfur in the heavy oil to yield a metal sulfide compound that forms the final active catalyst. In the case where the heavy oil feedstock includes sufficient or excess sulfur, the final activated catalyst may be formed in situ by heating the heavy oil feedstock to a temperature sufficient to liberate sulfur therefrom. In some cases, sulfur may be liberated at the same temperature that the precursor composition decomposes. In other cases, further heating to a higher temperature may be required.

If the catalyst precursor is thoroughly mixed throughout the heavy oil, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the catalyst precursor throughout the feedstock prior to thermal decomposition of the catalyst precursor may yield individual catalyst molecules rather than colloidal particles. Simply blending, while failing to sufficiently mix, the catalyst precursor with the feedstock typically causes formation of large agglomerated metal sulfide compounds that are micron-sized or larger.

In order to form dispersed metal sulfide catalyst particles, the conditioned feedstock is heated to a temperature in a range of about 275° C. (527° F.) to about 450° C. (842° F.), or in a range of about 310° C. (590° F.) to about 430° C. (806° F.), or in a range of about 330° C. (626° F.) to about 410° C. (770° F.).

The initial concentration of catalyst metal provided by dispersed metal sulfide catalyst particles can be in a range of about 1 ppm to about 500 ppm by weight of the heavy oil feedstock, or in a range of about 5 ppm to about 300 ppm, or in a range of about 10 ppm to about 100 ppm. The catalyst may become more concentrated as volatile fractions are removed from a resid fraction.

In the case where the heavy oil feedstock includes a significant quantity of asphaltene molecules, the dispersed metal sulfide catalyst particles may preferentially associate with, or remain in close proximity to, the asphaltene molecules. Asphaltene molecules can have a greater affinity for the metal sulfide catalyst particles since asphaltene molecules are generally more hydrophilic and less hydrophobic than other hydrocarbons contained within heavy oil. Because the metal sulfide catalyst particles tend to be very hydrophilic, the individual particles or molecules will tend to migrate toward more hydrophilic moieties or molecules within the heavy oil feedstock.

While the highly polar nature of metal sulfide catalyst particles causes or allows them to associate with asphaltene molecules, it is the general incompatibility between the highly polar catalyst compounds and hydrophobic heavy oil that necessitates the aforementioned intimate or thorough mixing of catalyst precursor composition within the heavy oil prior to decomposition and formation of the active catalyst particles. Because metal catalyst compounds are highly polar, they cannot be effectively dispersed within heavy oil if added directly thereto. In practical terms, forming smaller active catalyst particles results in a greater number of catalyst particles that provide more evenly distributed catalyst sites throughout the heavy oil.

IV. Upgraded Ebullated Bed Reactor

Figure 4:
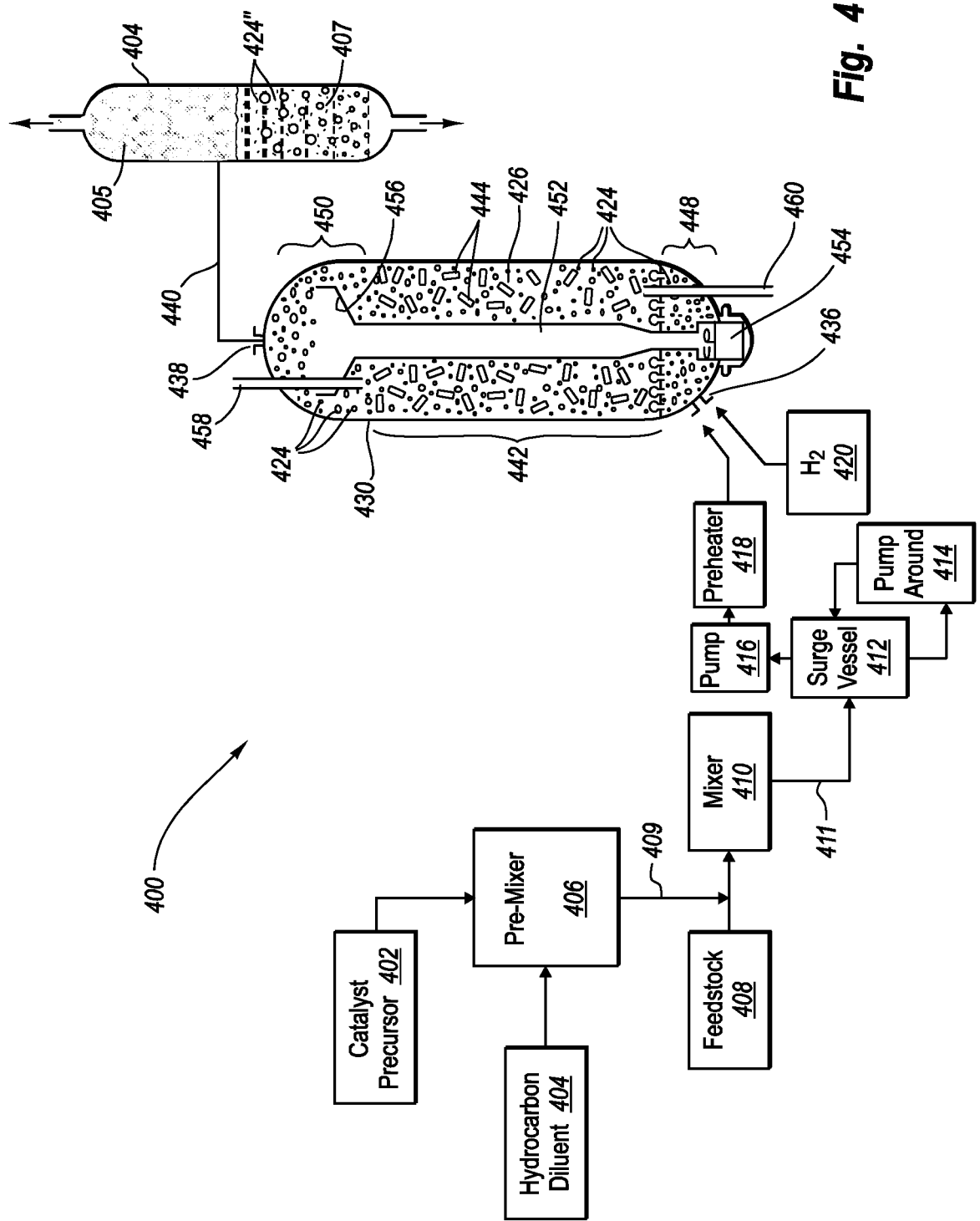
FIG. 4 schematically illustrates an exemplary ebullated bed hydroprocessing system using a dual catalyst system.

FIG. 4 schematically illustrates an example upgraded ebullated bed hydroprocessing system 400 that can be used in the disclosed methods and systems. Ebullated bed hydroprocessing system 400 includes an upgraded ebullated bed reactor 430 and a hot separator 404 (or other separator, such as a distillation tower). To create upgraded ebullated bed reactor 430, a catalyst precursor 402 is initially pre-blended with a hydrocarbon diluent 404 in one or more mixers 406 to form a catalyst precursor mixture 409. Catalyst precursor mixture 409 is added to feedstock 408 and blended with the feedstock in one or more mixers 410 to form conditioned feedstock 411. Conditioned feedstock is fed to a surge vessel 412 with pump around 414 to cause further mixing and dispersion of the catalyst precursor within the conditioned feedstock.

The conditioned feedstock from surge vessel 412 is pressurized by one or more pumps 416, passed through a pre-heater 418, and fed into ebullated bed reactor 430 together with pressurized hydrogen gas 420 through an inlet port 436 located at or near the bottom of ebullated bed reactor 430. Heavy oil material 426 in ebullated bed reactor 430 contains dispersed metal sulfide catalyst particles, schematically depicted as catalyst particles 424.

Heavy oil feedstock 408 may comprise any desired fossil fuel feedstock and/or fraction thereof including, but not limited to, one or more of heavy crude, oil sands bitumen, bottom of the barrel fractions from crude oil, atmospheric tower bottoms, vacuum tower bottoms, coal tar, liquefied coal, and other resid fractions. In some embodiments, heavy oil feedstock 408 can include a significant fraction of high boiling point hydrocarbons (i.e., nominally at or above 343° C. (650° F.), more particularly nominally at or above about 524° C. (975° F.)) and/or asphaltenes. Asphaltenes are complex hydrocarbon molecules that include a relatively low ratio of hydrogen to carbon that is the result of a substantial number of condensed aromatic and naphthenic rings with paraffinic side chains (See FIG. 1). Sheets consisting of the condensed aromatic and naphthenic rings are held together by heteroatoms such as sulfur or nitrogen and/or polymethylene bridges, thio-ether bonds, and vanadium and nickel complexes. The asphaltene fraction also contains a higher content of sulfur and nitrogen than does crude oil or the rest of the vacuum resid, and it also contains higher concentrations of carbon-forming compounds (i.e., that form coke precursors and sediment).

Ebullated bed reactor 430 further includes an expanded catalyst zone 442 comprising a heterogeneous catalyst 444. A lower heterogeneous catalyst free zone 448 is located below expanded catalyst zone 442, and an upper heterogeneous catalyst free zone 450 is located above expanded catalyst zone 442. Dispersed metal sulfide catalyst particles 424 are dispersed throughout material 426 within ebullated bed reactor 430, including expanded catalyst zone 442, heterogeneous catalyst free zones 448, 450, 452 thereby being available to promote upgrading reactions within what constituted catalyst free zones in the ebullated bed reactor prior to being upgraded to include the dual catalyst system.

To promote hydrocracking rather than mere hydrotreating reactions, the hydroprocessing reactor(s) are preferably operated at a temperature in a range of about 750° F. (399°

C.) to about 860° F. (460° C.), more preferably in a range of about 780° F. (416° C.) to about 830° F. (443° C.), are preferably operated at a pressure in a range of about 1000 psig (6.9 MPa) to about 3000 psig (20.7 MPa), more preferably in a range of about 1500 psig (10.3 MPa) to about 2500 psig (17.2 MPa), and are preferably operated at a space velocity (LHSV) in a range of about 0.05 $hr^{-1}$ to about 0.45 $hr^{-1}$, more preferably in a range of about 0.15 $hr^{-1}$ to about 0.35 $hr^{-1}$. The difference between hydrocracking and hydrotreating can also be expressed in terms of resid conversion (wherein hydrocracking results in the substantial conversion of higher boiling to lower boiling hydrocarbons, while hydrotreating does not). The hydroprocessing systems disclosed herein can result in a resid conversion in a range of about 40% to about 90%, preferably in a range of about 55% to about 80%. The preferred conversion range typically depends on the type of feedstock because of differences in processing difficulty between different feedstocks. Typically, conversion will be at least about 5% higher, preferably at least about 10% higher, compared to operating an ebullated bed reactor prior to upgrading to utilize a dual catalyst system as disclosed herein.

Material 426 in ebullated bed reactor 430 is continuously recirculated from upper heterogeneous catalyst free zone 450 to lower heterogeneous catalyst free zone 448 by means of a recycling channel 452 connected to an ebullating pump 454. At the top of recycling channel 452 is a funnel-shaped recycle cup 456 through which material 426 is drawn from upper heterogeneous catalyst free zone 450. Recycled material 426 is blended with fresh conditioned feedstock 411 and hydrogen gas 420.

Fresh heterogeneous catalyst 444 is introduced into ebullated bed reactor 430 through a catalyst inlet tube 458, and spent heterogeneous catalyst 444 is withdrawn through a catalyst withdrawal tube 460. Whereas the catalyst withdrawal tube 460 is unable to differentiate between fully spent catalyst, partially spent but active catalyst, and fresh catalyst, the existence of dispersed metal sulfide catalyst particles 424 provides additional catalytic activity, within expanded catalyst zone 442, recycle channel 452, and lower and upper heterogeneous catalyst free zones 448, 450. The addition of hydrogen to hydrocarbons outside of heterogeneous catalyst 444 minimizes formation of sediment and coke precursors, which are often responsible for deactivating the heterogeneous catalyst.

Ebullated bed reactor 430 further includes an outlet port 438 at or near the top through which converted material 440 is withdrawn. Converted material 440 is introduced into hot separator or distillation tower 404. Hot separator or distillation tower 404 separates one or more volatile fractions 405, which is/are withdrawn from the top of hot separator 404, from a resid fraction 407, which is withdrawn from a bottom of hot separator or distillation tower 404. Resid fraction 407 contains residual metal sulfide catalyst particles, schematically depicted as catalyst particles 424. If desired, at least a portion of resid fraction 407 can be recycled back to ebullated bed reactor 430 in order to form part of the feed material and to supply additional metal sulfide catalyst particles. Alternatively, resid fraction 407 can be further processed using downstream processing equipment, such as another ebullated bed reactor. In that case, separator 404 can be an interstage separator.

In some embodiments, operating the upgraded ebullated bed reactor to produce less fouling sediment while using the dual catalyst system results in reduced equipment fouling at any given sediment production rate and/or concentration.

For example, the rate of equipment fouling when operating the upgraded ebullated bed reactor using the dual catalyst system may result in a frequency of heat exchanger shutdowns for cleanout that is equal to or less than when initially operating the ebullated bed reactor.

In addition or alternatively, the rate of equipment fouling when operating the upgraded ebullated bed reactor using the dual catalyst system may result in a frequency of atmospheric and/or vacuum distillation tower shutdowns for cleanout that is equal or less than when initially operating the ebullated bed reactor.

In addition or alternatively, the rate of equipment fouling when operating of the upgraded ebullated bed reactor using the dual catalyst system may result in a frequency of changes or cleaning of filters and strainers that is equal or less than when initially operating the ebullated bed reactor.

In addition or alternatively, the rate of equipment fouling when operating of the upgraded ebullated bed reactor using the dual catalyst system may result in a frequency of switches to spare heat exchangers that is equal or less than when initially operating the ebullated bed reactor.

In addition or alternatively, the rate of equipment fouling when operating of the upgraded ebullated bed reactor using the dual catalyst system may result in a reduced rate of decreasing skin temperatures in equipment selected from one or more of heat exchangers, separators, or distillation towers than when initially operating the ebullated bed reactor.

In addition or alternatively, the rate of equipment fouling when operating of the upgraded ebullated bed reactor using the dual catalyst system may result in a reduced rate of increasing furnace tube metal temperatures than when initially operating the ebullated bed reactor.

In addition or alternatively, the rate of equipment fouling when operating of the upgraded ebullated bed reactor using the dual catalyst system may result in a reduced rate of increasing calculated fouling resistance factors for heat exchangers than when initially operating the ebullated bed reactor.

In some embodiments, operating the upgraded ebullated bed reactor while using the dual catalyst system may result in a sediment production rate and/or concentration that is equal to, less than or greater than when initially operating the ebullated bed reactor. In some embodiments, the sediment concentration can be based on a measurement of sediment in one or more of: (1) an atmospheric tower bottoms product; (2) a vacuum tower bottoms product; (3) product from a hot low pressure separator; or (4) fuel oil product before or after addition of cutter stocks.

V. Experimental Studies and Results

The following test studies demonstrate the effects and advantages of upgrading an ebullated bed reactor to use a dual catalyst system comprised of a heterogeneous catalyst and dispersed metal sulfide catalyst particles when hydroprocessing heavy oil. The comparative studies were carried out using a commercial ebullated bed unit and demonstrated that using the dual catalyst system in the upgraded ebullated bed hydroprocessing system produced less fouling sediment. The unit used for the examples was a three-stage ebullated bed unit. Due to the proprietary nature of the commercial unit operation, operating parameters are provided in relative rather than absolute terms.

A heavy vacuum gas oil can be used as a hydrocarbon diluent to disperse a catalyst precursor and form a precursor mixture, which is then added to and blended with the heavy oil feedstock to form a conditioned feedstock. Mixing an amount of catalyst precursor with an amount of hydrocarbon diluent forms an amount of a catalyst precursor mixture, which can then be mixed with a heavy oil feedstock to achieve a target loading of dispersed catalyst in the conditioned feedstock. By way of illustration, where the target loading of 30 ppm dispersed metal sulfide catalyst in the conditioned feedstock is desired (where the loading is expressed based on metal concentration), a catalyst precursor mixture can be prepared with 3000 ppm concentration of metal. A high shear mixing vessel can be used for blending a precursor mixture comprised of a hydrocarbon diluent and catalyst precursor (e.g., molybdenum 2-ethylhexanoate) with a heavy oil feedstock to form a conditioned feedstock. Proper blending can be achieved by first pre-blending the catalyst precursor with a hydrocarbon diluent to form a precursor mixture.

As mentioned above, the following examples were performed in a commercial ebullated bed unit. The unit used for the examples was a three-stage ebullated bed unit. Due to the proprietary nature of the commercial unit operation, operating parameters are provided in relative terms.

Comparative Example 1

The commercial ebullated bed unit for Comparative Example 1 was operated in a baseline condition, without the use of a dispersed catalyst additive used to form dispersed metal sulfide particles of the dual catalyst system. Only the commercial heterogeneous supported ebullated bed catalyst in standard amount was used to process the heavy oil feed. The ebullated bed reactors were operated at a baseline temperature, with all three reactor stages operating at the same weighted average bed temperature (WABT). The process feed was Urals vacuum residue, based on a 538° C. (1000° F.) vacuum cut point, and the unit was operated at a base feed rate, commonly expressed as a liquid hourly space velocity (LHSV), which is defined as the volumetric feed rate divided by the thermal reactor volume.

Under the abovementioned base conditions, a base level of resid conversion was reached, where conversion is defined based on the 538° C.+ vacuum residue fraction. After exiting the reactor system, the converted reactor effluent was processed through a series of separations, which included atmospheric distillation and vacuum distillation, resulting in the recovery of a vacuum tower bottoms (VTB) product. A baseline sediment concentration was measured in this VTB product using the IP-375 method.

During operation of the commercial unit under the baseline condition of Comparative Example 1, multiple heat exchangers located downstream of the ebullated bed reactor section were monitored for signs of fouling. These included three sequential heat exchangers located downstream of the vacuum distillation tower that are used to reduce the temperature of the vacuum tower bottoms product. For purposes of these examples, these are designated as VTB Cooler #1, VTB Cooler #2, and VTB Cooler #3. The system also included a heat exchanger that is designed to cool an auxiliary cut, designated as Auxiliary Cut Cooler, and a heat exchanger, which reduces the temperature of the atmospheric tower bottoms, designated as the ATB Cooler. The "auxiliary cut" is a product stream obtained from above the VTB product in the vacuum distillation tower. Fouling was measured based on the differential pressure across each of these exchangers, measured in pressure units of kPa. The fouling rate is expressed as an average daily rate of increase of the differential pressure over a multi-day period, expressed in kPa/day.

Fouling results are shown below after Example 2 in Table 1. All five of the heat exchangers being monitored showed appreciable rates of fouling, ranging from 37 kPa/day for the Auxiliary Cut Cooler to 196 kPa/day for the ATB Cooler. Fouling rates for the three VTB coolers ranged from 45 to 124 kPa/day. These rates are significant, and indicate a rate of heat exchanger fouling that is sufficient to require regular shutdowns of the individual heat exchangers for cleaning. To accommodate this need, the commercial unit was equipped with parallel heat exchangers, which allow key exchangers to be cleaned without shutting down the unit operation.

Example 2

In Example 2, the same commercial unit was used as described in Comparative Example 1. However, the unit was upgraded to operate using a dual catalyst system comprising the commercial heterogeneous supported ebullated bed catalyst in the same amount together with dispersed metal sulfide catalyst particles formed using a well-dispersed catalyst precursor. The dispersed catalyst precursor was added to the process feed at an amount sufficient to provide 35 ppm by weight of molybdenum catalyst metal based on the amount of vacuum residue feedstock. The feed rate of Ural vacuum residue feedstock was maintained at the same baseline rate used in Comparative Example 1.

In Example 2, the reactor temperatures, expressed as the weighted average bed temperature, were increased by 9° C. compared to the baseline temperature used in Comparative Example 1. All three reactor stages were increased in temperature by the same amount and therefore continued to be operated at equal WABT across the three reactors. This increase in temperature resulted in an increase in resid conversion of 9.4 percentage points compared to the baseline conversion in Comparative Example 1. This would ordinarily be expected to result in a significant increase in sediment concentration in the vacuum tower bottoms product. However, because of the effect of the dual catalyst system used in Example 2, the measured sediment concentration (using the IP-375 method) in the vacuum tower bottoms was 0.95 times the base concentration of Comparative Example 1, or nearly the same sediment concentration.

One skilled in the art would expect that with a sediment concentration that is nearly the same as in Comparative Example 1, the process utilized in Example 2 would be expected to show similar rates of heat exchanger fouling. However, the actual fouling rates observed for Example 2 were substantially lower than in Comparative Example 1. As shown in Table 1, fouling rates for the VTB coolers ranged from 0.01 kPa/day for VTB Cooler #1 to 41 kPa/day for VTB Cooler #3. These correspond to reductions in fouling rate of an incredible 99.9% for VTB Cooler #1, 71.1% for VTB Cooler #2, and 66.9% for VTB Cooler #3. Similarly, the fouling rates for the Auxiliary Cut Cooler and the ATB Cooler were substantially lower than in Comparative Example 1, with reductions of 97.3% and 93.4%, respectively.

The observation of drastically reduced fouling rate at nearly identical concentration of measured IP-375 sediment in the vacuum tower bottoms product indicates that the composition of the sediment is significantly changed by the effect of the dispersed catalyst additive of the present invention, and that sediment with a reduced fouling tendency is being produced.

TABLE 1

|  | Comparative Example 1 No Dispersed Catalyst | Example 2 Dispersed Catalyst (35 ppm Mo in Vacuum Residue Feed) |
|---|---|---|
| Weighted Average Bed Temperature, ° C. | Base | Base + 9° C. |
| Resid Conversion, W % based on 538° C. Cut Point | Base | Base + 9.4% |
| IP-375 Sediment in Vacuum Tower Bottoms, Relative | Base | 0.95 * Base |

|  | Heat Exchanger Fouling Rate (Rate of Differential Pressure Increase) kPa/day | | % Reduction in Fouling Rate |
|---|---|---|---|
| VTB Cooler #1 | +90 | +0.1 | 99.9% |
| VTB Cooler #2 | +45 | +13 | 71.1% |
| VTB Cooler #3 | +124 | +41 | 66.9% |
| Auxiliary Cut Cooler | +37 | +1 | 97.3% |
| ATB Cooler | +196 | +13 | 93.4% |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of upgrading an ebullated bed hydroprocessing system that includes one or more ebullated bed reactors to utilize a dual catalyst system in order to produce less fouling sediment, comprising:
    initially operating an ebullated bed reactor of the hydroprocessing system using a heterogeneous catalyst to hydroprocess heavy oil at initial hydroprocessing conditions to yield an initial process stream, including hydroprocessing heavy oil at an initial reactor severity based on at least one of temperature, conversion, or throughput, an initial sediment production rate and/or initial sediment concentration in the initial process stream and an initial rate of equipment fouling;
    determining the initial sediment production rate and/or initial sediment concentration in the initial process stream and the initial rate of equipment fouling of the ebullated bed hydroprocessing system;
    thereafter upgrading the ebullated bed reactor to operate using a dual catalyst system comprised of dispersed metal sulfide catalyst particles and heterogeneous catalyst;
    operating the upgraded ebullated bed reactor using the dual catalyst system by selecting an operating temperature, a quantity of the of dispersed metal sulfide catalyst particles, and a quantity of the heterogeneous catalyst configured to hydroprocess heavy oil at a same or increased reactor severity and produce a modified process stream containing less fouling sediment at a quantity greater than or equal to sediment produced when initially operating the ebullated bed reactor, resulting in less equipment fouling of the hydroprocessing system at a given sediment production rate and/or sediment concentration in the process stream compared to when operating the ebullated bed reactor at the initial hydroprocessing conditions; and
    determining the sediment production rate of the upgraded ebullated bed reactor and/or sediment concentration in the modified process stream and the rate of equipment fouling of the ebullated bed hydroprocessing system after upgrading the ebullated bed reactor.

2. The method of claim 1, wherein operating the upgraded ebullated bed reactor using the dual catalyst system comprises:
    increasing reactor severity and thereby producing converted products at a higher rate than an initial production rate of converted products when operating at the initial conditions;
    producing sediment at a rate and/or concentration that is no higher than the initial sediment production rate and/or concentration when operating at the initial conditions; and
    equipment fouling occurring at a reduced rate compared to the initial rate of equipment fouling when operating at the initial conditions.

3. The method of claim 1, wherein operating the upgraded ebullated bed reactor using the dual catalyst system comprises:
    increasing reactor severity and thereby producing converted products at a higher rate than an initial production rate of converted products when operating at the initial conditions;
    producing sediment at a higher rate and/or concentration than the initial sediment production rate and/or concentration when operating at the initial conditions; and
    equipment fouling occurring at a rate that is no higher than the initial rate of equipment fouling when operating at the initial conditions.

4. The method of claim 3, wherein the reactor severity is increased so that the production rate of converted products is thereby increased, when operating the upgraded ebullated bed reactor using the dual catalyst system, by at least one of:
    (i) higher temperature and higher conversion at same or similar throughput as when operating at the initial conditions;
    (ii) higher temperature and higher throughput at same or similar conversion as when operating at the initial conditions; or
    (iii) higher temperature, higher throughput, and higher conversion than when operating at the initial conditions.

5. The method of claim 4, wherein throughput is increased by at least 5% when operating the upgraded ebullated bed reactor than when operating at the initial conditions.

6. The method of claim 4, wherein conversion is increased by at least 5% when operating the upgraded ebullated bed reactor than when operating at the initial conditions.

7. The method of claim 4, wherein temperature is increased by at least 2.5° C. when operating the upgraded ebullated bed reactor than when operating at the initial conditions.

8. The method of claim 1, wherein the rate of equipment fouling is determined, when operating at the initial conditions and when operating the upgraded ebullated bed reactor using the dual catalyst system, by at least one of:
    (i) frequency of required heat exchanger clean-outs;
    (ii) frequency of switching to spare heat exchangers;
    (iii) frequency of filter changes;
    (iv) frequency of strainer clean-outs or changes;
    (v) rate of decrease in equipment skin temperatures, including in equipment selected from heat exchangers, separators, or distillation towers;
    (vi) rate of increase in furnace tube metal temperatures;
    (vii) rate of increase in calculated fouling resistance factors for heat exchangers and furnaces;

(viii) rate of increase in differential pressure of heat exchangers;
(ix) frequency of cleaning atmospheric and/or vacuum distillation towers; or
(x) frequency of maintenance turnarounds.

9. The method of claim 1, wherein sediment production is determined, when operating at the initial conditions and when operating the upgraded ebullated bed reactor using the dual catalyst system, by at least one of:
(i) absolute sediment production rate; or
(ii) sediment concentration in at least one process stream.

10. The method of claim 9, wherein the sediment concentration is measured in at least one process stream selected from atmospheric residue, atmospheric distillation tower bottoms, vacuum residue, vacuum distillation tower bottoms, atmospheric tower feed, hot low pressure separator product, fuel oil product, vacuum tower bottoms after addition of cutter stocks.

11. The method of claim 1, wherein after upgrading the ebullated bed reactor to use the dual catalyst system the sediment production rate and/or concentration is maintained or increased compared to the initial sediment production rate and/or concentration and the rate of equipment fouling is decreased by at least 25% compared to the initial rate of equipment fouling.

12. The method of claim 1, wherein after upgrading to use the dual catalyst system the sediment production rate is increased by at least 10% compared to the initial sediment production rate and the rate of equipment fouling is maintained or decreased compared to the initial rate of equipment fouling.

13. The method of claim 1, wherein after upgrading to use the dual catalyst system the sediment concentration in the process stream is increased by at least 10% compared to the initial sediment concentration and the rate of equipment fouling is maintained or decreased compared to the initial rate of equipment fouling.

14. The method of claim 1, wherein the heavy oil comprises at least one of heavy crude oil, oil sands bitumen, residuum from refinery processes, atmospheric tower bottoms having a nominal boiling point of at least 343° C. (650° F.), vacuum tower bottoms having a nominal boiling point of at least 524° C. (975° F.), resid from a hot separator, resid pitch, resid from solvent extraction, or vacuum residue.

15. The method of claim 1, wherein the dispersed metal sulfide catalyst particles are less than 1 μm in size.

16. The method of claim 1, wherein upgrading the ebullated bed reactor to operate using a dual catalyst system includes forming the dispersed metal sulfide catalyst particles in situ within the heavy oil from a catalyst precursor.

17. The method of claim 16, wherein forming the dispersed metal sulfide catalyst particles in situ within the heavy oil comprises mixing the catalyst precursor with a diluent hydrocarbon to form a diluted precursor mixture, blending the diluted precursor mixture with the heavy oil to form conditioned heavy oil, and heating the conditioned heavy oil to decompose the catalyst precursor and form the dispersed metal sulfide catalyst particles in situ within the heavy oil.

18. A method of upgrading an ebullated bed hydroprocessing system that includes one or more ebullated bed reactors to utilize a dual catalyst system in order to produce less fouling sediment, comprising:
initially operating an ebullated bed reactor of the hydroprocessing system using a heterogeneous catalyst to hydroprocess heavy oil at initial hydroprocessing conditions to yield an initial process stream, including hydroprocessing heavy oil at an initial reactor severity based on at least one of temperature, conversion, or throughput, an initial sediment production rate and/or initial sediment concentration in the initial process stream and an initial rate of equipment fouling;
determining the initial sediment production rate and/or initial sediment concentration in the initial process stream and the initial rate of equipment fouling of the ebullated bed hydroprocessing system;
thereafter upgrading the ebullated bed reactor to operate using a dual catalyst system comprised of dispersed metal sulfide catalyst particles and heterogeneous catalyst; and
operating the upgraded ebullated bed reactor using the dual catalyst system bar selecting an operating temperature, a quantity of the of dispersed metal sulfide catalyst particles, and a quantity of the heterogeneous catalyst configured to hydroprocess heavy oil at a reactor severity causing the same or higher sediment production rate and/or sediment concentration in the process stream and a reduced rate of equipment fouling than when operating the ebullated bed reactor at the initial hydroprocessing conditions; and
determining the sediment production rate of the upgraded ebullated bed reactor and/or sediment concentration and the rate of equipment fouling of the ebullated bed hydroprocessing system after upgrading the ebullated bed reactor.

19. The method of claim 18, wherein operating the upgraded ebullated bed reactor includes reducing the rate of equipment fouling by at least 25% compared to the initial rate of equipment fouling.

20. A method of upgrading an ebullated bed hydroprocessing system that includes one or more ebullated bed reactors to utilize a dual catalyst system in order to produce less fouling sediment, comprising:
initially operating an ebullated bed reactor of the hydroprocessing system using a heterogeneous catalyst to hydroprocess heavy oil at initial hydroprocessing conditions to yield an initial process stream, including hydroprocessing heavy oil at an initial reactor severity based on at least one of temperature, conversion, or throughput, an initial sediment production rate and/or initial sediment concentration in the initial process stream and an initial rate of equipment fouling;
determining the initial sediment production rate and/or initial sediment concentration in the initial process stream and the initial rate of equipment fouling of the ebullated bed hydroprocessing system;
thereafter upgrading the ebullated bed reactor to operate using a dual catalyst system comprised of dispersed metal sulfide catalyst particles and heterogeneous catalyst; and
operating the upgraded ebullated bed reactor using the dual catalyst system by selecting an operating temperature, a quantity of the of dispersed metal sulfide catalyst particles, and a quantity of the heterogeneous catalyst configured to hydroprocess heavy oil at a reactor severity causing in a higher sediment production rate and/or sediment concentration in the process stream and the same or lower rate of equipment fouling than when operating the ebullated bed reactor at the initial hydroprocessing conditions; and
determining the sediment production rate of the upgraded ebullated bed reactor and/or sediment concentration and the rate of equipment fouling of the ebullated bed hydroprocessing system after upgrading the ebullated bed reactor.

21. The method of claim 20, wherein operating the upgraded the ebullated bed reactor includes increasing the sediment production rate by at least 10% compared to the initial sediment production rate.

22. The method of claim 20, wherein operating the upgraded the ebullated bed reactor includes increasing the sediment concentration by at least 10% compared to the initial sediment concentration.

* * * * *

UNITED STATES PATENT AND TRADEMARK OFFICE
CERTIFICATE OF CORRECTION

PATENT NO. : 11,118,119 B2
APPLICATION NO. : 15/908111
DATED : September 14, 2021
INVENTOR(S) : David M. Mountainland et al.

Page 1 of 1

It is certified that error appears in the above-identified patent and that said Letters Patent is hereby corrected as shown below:

On the Title Page

<u>Page 5, item (56), Column 2</u>
References Cited, Other Publications, change "N. Panariti et al.: "petroleum Residue Upgrading with Dispered Catalysts Part 1. Catalysts Activity and Selctivity" Applied Catalysts A: General, vol. 204, Mar. 31, 2000 (Mar. 1, 2000) pp. 203-213" to –N. Panariti et al.: "petroleum Residue Upgrading with Dispersed Catalysts Part 1. Catalysts Activity and Selectivity" Applied Catalysts A: General, vol. 204, Mar. 31, 2000 (Mar. 1, 2000) pp. 203-213–

In the Specification

<u>Column 13</u>
Line 23, change "recycles" to –recycled–

In the Claims

<u>Column 32</u>
Claim 18, Line 15, change "bar" to –by–

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*